(12) United States Patent
Kato

(10) Patent No.: US 8,700,953 B2
(45) Date of Patent: Apr. 15, 2014

(54) OPERATION MANAGEMENT DEVICE, OPERATION MANAGEMENT METHOD, AND OPERATION MANAGEMENT PROGRAM

(75) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 361 days.

(21) Appl. No.: 13/003,793

(22) PCT Filed: Sep. 14, 2009

(86) PCT No.: PCT/JP2009/065990
§ 371 (c)(1),
(2), (4) Date: Jan. 12, 2011

(87) PCT Pub. No.: WO2010/032701
PCT Pub. Date: Mar. 25, 2010

(65) Prior Publication Data
US 2011/0161743 A1    Jun. 30, 2011

(30) Foreign Application Priority Data
Sep. 18, 2008    (JP) ................................ 2008-239068

(51) Int. Cl.
*G06F 11/00* (2006.01)
(52) U.S. Cl.
USPC ............................................... 714/26
(58) Field of Classification Search
USPC ............................................... 714/26
See application file for complete search history.

(56) References Cited

U.S. PATENT DOCUMENTS

| | | | |
|---|---|---|---|
| 7,590,513 B2* | 9/2009 | Jiang et al. | 703/2 |
| 7,647,524 B2* | 1/2010 | Ide et al. | 714/38.13 |
| 7,668,953 B1* | 2/2010 | Sinclair et al. | 709/224 |
| 7,934,131 B1* | 4/2011 | Pinheiro et al. | 714/43 |
| 8,095,830 B1* | 1/2012 | Cohen et al. | 714/45 |
| 8,250,408 B1* | 8/2012 | Cohen et al. | 714/33 |
| 8,347,148 B1* | 1/2013 | Harrison et al. | 714/47.1 |
| 2007/0088974 A1* | 4/2007 | Chandwani et al. | 714/6 |
| 2008/0016412 A1* | 1/2008 | White et al. | 714/48 |

(Continued)

FOREIGN PATENT DOCUMENTS

JP    6-175626 A    6/1994
JP    2002099448 A    4/2002

(Continued)

OTHER PUBLICATIONS

International Search Report for PCT/JP2009/065990 mailed Dec. 15, 2009.

*Primary Examiner* — Bryce Bonzo
(74) *Attorney, Agent, or Firm* — Sughrue Mion, PLLC

(57) ABSTRACT

An operation management device includes: an information collection module which collects, from a managed device, first and second performance information showing a time series change in the performance information; a correlation model generation module which derives a correlation function between the first and second performance information and creates a correlation model based on the correlation function; a correlation change analysis module which judges whether or not the current first and second performance information acquired by the information collection module satisfy the relation shown by the conversion function between the first and second performance information of the correlation model within a specific error range; and a failure period extraction module which, when the first and second performance information does not satisfy the relation shown by the conversion function of the correlation model, extracts a period of that state as a failure period.

11 Claims, 17 Drawing Sheets

(56) References Cited

U.S. PATENT DOCUMENTS

| | | | |
|---|---|---|---|
| 2008/0155336 A1* | 6/2008 | Joshi et al. | 714/37 |
| 2009/0217099 A1* | 8/2009 | Kato | 714/37 |
| 2009/0313508 A1* | 12/2009 | Yan et al. | 714/47 |
| 2010/0115341 A1* | 5/2010 | Baker et al. | 714/37 |
| 2011/0225462 A1* | 9/2011 | Kato | 714/47.1 |

FOREIGN PATENT DOCUMENTS

| | | | |
|---|---|---|---|
| JP | 2005257416 A | 9/2005 |
| JP | 2006048253 A | 2/2006 |
| JP | 2006092358 A | 4/2006 |
| JP | 4089339 B | 5/2006 |
| JP | 2006146668 A | 6/2006 |
| JP | 2007207117 A | 8/2007 |
| JP | 2007272693 A | 10/2007 |
| JP | 2007293393 A | 11/2007 |
| JP | 2008059102 A | 3/2008 |
| JP | 2008191849 A | 8/2008 |

* cited by examiner

FIG.15

| TIME | A.CPU | A.MEM | ... | B.CPU | ... |
|---|---|---|---|---|---|
| ... | ... | ... | ... | ... | ... |
| 2007/10/05 17:25 | 12 | 80 | ... | 33 | ... |
| 2007/10/05 17:26 | 15 | 79 | ... | 32 | ... |
| 2007/10/05 17:27 | 34 | 51 | ... | 32 | ... |
| 2007/10/05 17:28 | 63 | 51 | ... | 35 | ... |
| 2007/10/05 17:29 | 20 | 81 | ... | 50 | ... |
| 2007/10/05 17:30 | 10 | 78 | ... | 51 | ... |
| 2007/10/05 17:31 | 11 | 79 | ... | 34 | ... |
| ... | ... | ... | ... | ... | ... |
| 2007/11/07 8:30 | 20 | 79 | ... | 90 | ... |

511

OPERATION MANAGEMENT DEVICE, OPERATION MANAGEMENT METHOD, AND OPERATION MANAGEMENT PROGRAM

This Application is the National Phase of PCT/JP2009/065990, filed Sep. 14, 2009, which claims the Priority right based on Japanese Patent Application No. 2008-239068 filed on Sep. 18, 2008 and the disclosure thereof is hereby incorporated by reference in its entirety.

TECHNICAL FIELD

The present invention relates to operations of information communication services such as web services and business services. More specifically, the present invention relates to detecting failures generated in the services and specifying the causes thereof.

BACKGROUND ART

In operations of information communication services such as web services and business services, there is an operation management device which detects generation of failures and specifies the causes thereof.

As related technical documents thereof, there are following documents. Patent Document 1 discloses a technique which regularly measures response time of a web server and the like, and informs the administrator thereof when the value of the response time does not satisfy a compensation value. Patent Document 2 discloses a technique which judges the similarity in changes between a plurality of different kinds of parameters such as a fuel flow amount and a car body speed, etc. Patent Document 3 discloses a technique which calculates a distribution moment of a difference level in a case where data of a plurality of directions is put into a model, and judges it as having abnormality when the distribution moment exceeds a threshold value.

Patent Document 4 discloses a technique which, regarding analysis information acquired by analyzing a log of a monitor-target computer, retrieves a pattern similar to analysis information of the past to predict generation of failures based thereupon. Patent Document 5 discloses a technique which displays the history of the state of plant equipment changing in time series on a display in an easily comprehensible manner (by employing color-coding, for example). Patent Document 6 discloses a failure information display device which displays generation points of failures and the generation order thereof in an easily recognizable manner visually.

Patent Document 1: Japanese Unexamined Patent Publication 2002-099448
Patent Document 2: Japanese Unexamined Patent Publication 2005-257416
Patent Document 3: Japanese Unexamined Patent Publication 2006-048253
Patent Document 4: Japanese Unexamined Patent Publication 2007-293393
Patent Document 5: Japanese Unexamined Patent Publication Hei 06-175626
Patent Document 6: Japanese Patent No. 4089339

DISCLOSURE OF THE INVENTION

Problems to be Solved by the Invention

With an operation management device of Patent Document 2, the level of mutual relationship between performance information is calculated based on the levels in changes of the performance information in order to properly detect the performance deterioration failure described above. Therefore, it is possible to properly judge whether or not the changes according to the passages of time in different kinds of performance information are similar.

However, with the operation management device of Patent Document 2, it is necessary to understand the structure and behavior of the target system correctly and to know, with what kind of failures, how the mutual relationships becomes destroyed, in order to specify the actually generated failure from the number and content of the destroyed mutual relationships. Therefore, the administrator needs to have a vast amount of knowledge and experiences. In addition, there is a risk of deriving a wrong analysis result because of poor understanding.

Further, the operation management devices of Patent Documents 4 and 6 present a failure message according to the generated order and the actual layout relation of failure units, so that it is possible to lighten the work for estimating the origin of the generated failure by making it easier to recognize the failure point visually. Further, through displaying various kinds of performance information on the time axis along with the failure message, it is possible with a general-purpose operation management device that retrieves similar failures of the past to predict generation of failures based on the analysis information of the similar failures.

However, with the conventional operation management devices, it is necessary to use information that can be clearly taken out as information of an occurrence of a failure such as a failure message and log information when analyzing the failure and retrieving past cases. In a case of performance information continuing in time series regardless of normal or abnormal, it is not possible to clearly take out which part is a failure only from a value thereof and the changing state. Thus, it is a problem that visual display of those and retrieval of similar cases cannot be done in a desired manner.

In the remaining Patent Documents 1, 3, and 5, there is no depiction regarding a technique that is capable of clearly presenting the failure generating point and the causes thereof. Thus, even if each of those documents is combined, it is not possible to achieve an operation management device that is capable of clearly presenting the failure generation point and the causes thereof in an easily understandable manner to administrators that are not so experienced.

An object of the present invention is to provide an operation management device, an operation management method, and an operation management program, which are capable of clearly presenting the failure generation point and the causes thereof in an easily understandable manner to administrators that are not so experienced and do not understand the structure and behavior of the target system accurately.

Means for Solving the Problems

In order to achieve the foregoing object, the operation management device according to the present invention is characterized as an operation management device which acquires performance information for each of a plurality kinds of performance items from a single or a plurality of managed devices configuring a system and performs operation management of the managed devices, and the operation management device includes: an information collection module which collects at least first performance information showing a time series change in the performance information regarding a first element and second performance information showing time series change in the performance information regarding a second element out of elements, when the performance items or the managed devices are taken as the elements; a correlation model generation module which derives a correlation function between the first and second performance information, and generates a correlation model based on the correlation function; a correlation change analysis module which judges whether or not the current first and second performance information acquired by the information collection module satisfies a relation shown by the correlation function within a specific error range; and a failure period extraction module which, when the correlation change analysis module judges that it is in a state where the first and second performance information does not satisfy the relation shown by the correlation function, extracts a period of that state as a failure period.

In order to achieve the foregoing object, the operation management method according to the present invention is characterized as an operation management method which acquires performance information for each of a plurality kinds of performance items from a single or a plurality of managed devices configuring a system and performs operation management of the managed devices, and the operation management method includes: collecting at least first performance information showing a time series change in the performance information regarding a first element and second performance information showing time series change in the performance information regarding a second element out of elements, when the performance items or the managed devices are taken as the elements; deriving a correlation function between the first and second performance information, and generating a correlation model based on the correlation function; judging whether or not the acquired current first and second performance information satisfies a relation shown by the correlation function within a specific error range; and when judged that it is in a state where the first and second performance information does not satisfy the relation shown by the correlation function, extracting a period of that state as a failure period.

In order to achieve the foregoing object, the operation management program according to the present invention is characterized an operation management program for causing a computer, which controls an operation management device that acquires performance information for each of a plurality kinds of performance items from a single or a plurality of managed devices configuring a system and performs operation management of the managed devices, to execute: a function which collects at least first performance information showing a time series change in the performance information regarding a first element and second performance information showing time series change in the performance information regarding a second element out of elements, when performance items or the managed devices are taken as the elements; a function which derives a correlation function between the first and second performance information, and generates a correlation model based on the correlation function; a function which judges whether or not the acquired current first and second performance information satisfies a relation shown by the correlation function within a specific error range; and a function which, when it is judged to be in a state where the first and second performance information does not satisfy the relation shown by the correlation function, extracts a period of that state as a failure period.

Effect of the Invention

As described above, the present invention is structured to generate a correlation model from the performance information and detect a period deviated from the correlation model as a failure period. Thus, it becomes easier to detect generation of a failure properly and further to specify factors to be the causes thereof. This makes it possible to present the failure generation point and the causes thereof to the administrator in an easily understandable manner.

BRIEF DESCRIPTION OF THE DRAWINGS

FIG. 15 is an explanatory illustration showing an example of performance information detected and accumulated by an information collection module shown in FIG. 1;

BEST MODES FOR CARRYING OUT THE INVENTION

First Exemplary Embodiment

Figure 1:
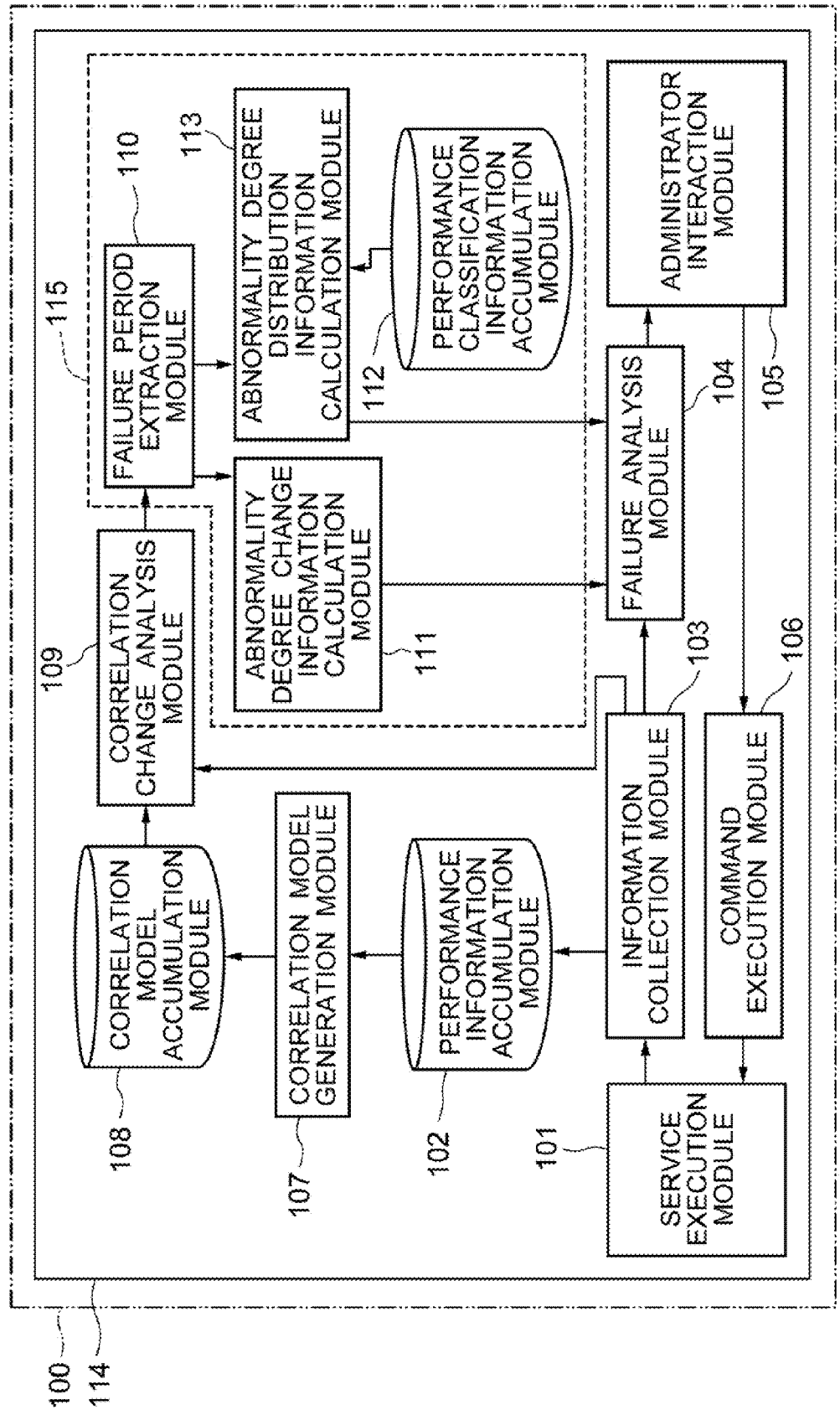
FIG. 1 is an explanatory illustration showing the structure of an operation management device according to a first exemplary embodiment of the invention.

Hereinafter, the structure of an exemplary embodiment of the invention will be described by referring to the accompanying drawings.

The basic structure of the exemplary embodiment will be described first, and more specific contents thereof will be described thereafter.

An operation management device 100 according to the exemplary embodiment is an operation management device which acquires performance information for each of a plurality of kinds of performance items from a single or a plurality of managed devices (service execution modules 101) configuring a system, and performs operation management of the managed devices. The operation management device 100 includes: an information collection module 103 which collects at least first performance information showing a time series change in the performance information regarding a first element and second performance information showing a time series change in the performance information regarding a second element out of the elements (service execution module 101) when performance items or the managed devices are taken as the elements; a correlation model generation module 107 which derives a correlation function between the first and second performance information collected by the information collection module 103 and creates a correlation model based on the correlation function; a correlation change analysis module 109 which judges whether or not the current first and second performance information acquired by the information collection module 103 satisfies the relation shown by the correlation function within a specific error range; and a failure period extraction module 110 which, when the correlation change analysis module 109 judges that it is in a state where the first and second performance information does not satisfy the relation shown by the correlation function, extracts a period of that state as a failure period.

Further, the operation management device 100 includes an abnormality degree change information calculation module 111 which calculates statistical information regarding the abnormality degree that is the degree of the first and second performance information being deviated from the conversion function during the failure period extracted by the failure period extraction module 110 as abnormality degree change information.

Further, the operation management device 100 includes: a performance classification information accumulation module 112 which classifies the performance information into a plurality of kinds and saves as performance classification information; and an abnormality degree distribution information calculation module 113 which extracts the performance information and the abnormality degrees contained in the correlation changed in the failure period extracted by the failure period extraction module 110 from the performance classification information accumulated in the performance classification information accumulation module 112, and calculates abnormality degree distribution information that shows the distribution of the abnormality degrees for each element of the performance information.

With such structure, the exemplary embodiment of the invention can detect generation of a failure properly, easily detect the factor for the cause thereof further, and present the failure generation point and the cause thereof to the administrator in an easily understandable manner.

Hereinafter, this will be described in more details.

FIG. 1 is an explanatory illustration showing the structure of the operation management device 100 according to the first exemplary embodiment of the invention. The operation management device 100 includes a control unit 114 as a main body that executes a computer program, which is actually configured with a CPU, a RAM, an OS, and the like.

The control unit 114 is formed with a CPU, and the service execution module 101, the information collection module 103, the failure analysis module 104, the administrator interaction module 105, a command execution module 106, the correlation model generation module 107, and a correlation change analysis module 109 are implemented on software by having the CPU execute a program. Further, a performance information accumulation module 102 and a correlation model accumulation module 108 of the operation management device 100 are achieved by a nonvolatile storage module such as a disk device provided to the operation management device 100. In FIG. 1, the performance information accumulation module 102 and the correlation model accumulation module 108 are also illustrated within the control unit 114 for implementing easy understanding. Further, the control unit 114 includes an abnormality degree analysis section 115 to be described later. While the drawing shows the case of achieving the structures of the control unit 114 on software, it is not limited only to such case. The structures of the control unit 114 may also be formed as hardware structures.

The service execution module 101 provides information communication services such as web services and business services. There may be a single service execution module 101 or a plurality of service execution modules 101. Further, the service execution module 101 may be formed with a physically different computer from other elements of the operation management device 100 or may be formed with a same computer. The performance information accumulation module 102 accumulates the performance information of each element of the service execution module 101. The information collection module 103 detects and outputs action state of the performance information, an abnormality message, and the like of the service execution module 101, and accumulates the performance information contained in the action state to the performance information accumulation module 102.

The failure analysis module 104 receives the output from the information collection module 103 and the abnormality degree analysis section 115, executes a failure analysis, and outputs the result thereof to the administrator interaction module 105. The administrator interaction module 105 receives the result of the failure analysis outputted from the failure analysis module 104, presents the result to the administrator, and receives input from the administrator. The command execution module 106 executes processing as the action dealing with the failure on the service execution module 101 according to an instruction from the administrator interaction module 105.

The correlation model generation module 107 takes out the performance information of a prescribed period from the performance information accumulation module 102 and derives the conversion function of the time series of two arbitrary performance information values to generate the correlation model of the overall operating state of the service execution module 101. The correlation model accumulation module 108 accumulates the correlation model generated by the correlation model generation module 107.

The correlation change analysis module 109 receives newly detected performance information from the information collection module 103, analyzes whether or not the performance values contained in the performance information satisfy the relation shown by the conversion function between each piece of the performance information of the correlation model stored in the correlation model accumulation module 108 within a prescribed error range, and outputs the result thereof.

Next, a comparative example corresponding to the operation management device according to the exemplary embodiment of the invention will be described by using FIG. 1 in order to clearly illustrate the features of the operation management device according to the exemplary embodiment of the invention. An operation management device that is not provided with the abnormality degree analysis section 115 of the exemplary embodiment of the invention is assumed as the comparative example. The operation management device of the comparative example is not provided with the abnormality degree analysis section 115, so that the failure analysis module 104 receives output from the information collection module 103 and the correlation change analysis module 109, performs a failure analysis, and outputs the result thereof to the administrator interaction module 105. The administrator interaction module 105 receives the result of the failure analysis outputted from the failure analysis module 104, presents the result to the administrator, and receives input from the administrator. The command execution module 106 executes processing as the command for the failure on the service execution module 101 according to an instruction from the administrator interaction module 105.

In the operation management device according to the comparative example, first, the information collection module 103 detects the action state of the service execution module 101, and accumulates the detected information to the performance information accumulation module 102 as the performance information. For example, in a case where the service execution module 101 executes a web service, the information collection module 103 detects a CPU utilization rate and memory remaining amount of each server that provides the web service as the performance information of the service execution module 101 at a prescribed time interval.

FIG. 15 is an explanatory illustration showing an example of performance information 511 that is detected and accumulated by the information collection module 103 shown in FIG. 1. As shown in FIG. 15, the performance information 511 acquired by the information collection module 103 contains "A. CPU", "A. MEM", and "B. CPU", for example. The item "A. CPU" out of the performance information 511 shown in FIG. 15 shows a value of the CPU utilization rate of a given server (service execution module 101), and the value of "2007/10/05 17:25" is "12". Further, values such as "15", "34", and "63" are detected at an interval of 1 minute from the time "17:26". Similarly, "A. MEM" shows the value of the memory remaining amount of the same server and "B. CPU" shows the value of the CPU utilization rate of another server, which are detected at the same time.

As shown in FIG. 1, the failure analysis module 104 executes the failure analysis by a method determined in advance. As an example, the failure analysis module 104 executes the failure analysis through judging whether or not the load of any specific server (the service execution module 101) is high according to a judgment condition such as a predetermined threshold value based on the values of the performance information detected by the information collection module 103 by presenting a warning message to the administrator when the CPU utilization rate is equal to or larger than a prescribed value.

The administrator interaction module 105 presents the result of the failure analysis analyzed by the failure analysis module 104 to the administrator, and executes a command on the service execution module 101 via the command execution module 106 when the administrator inputs an instruction for executing some kind of command. For example, the administrator can take an action of inputting a command for reducing a work amount to the command execution module 106, and action of inputting a command for changing the structure to disperse the load to the command execution module 106, etc., knowing that the CPU load is high. The failure is dealt with the service execution module 101 continuously by repeating such information collection, analysis, and dealing processing.

Further, the performance abnormality can be detected more precisely in such failure analysis by the correlation model generation module 107, the correlation model accumulation module 108, and the correlation change analysis module 109.

The action of analysis in correlation changes of the performance information executed by the operation management device 100 shown in FIG. 1 will be described. Regarding the performance information 511 shown in FIG. 15 accumulated in the performance information accumulation module 102, the correlation model generation module 107 creates a correlation model by deriving the conversion function between each piece of performance information, and accumulates the model to the correlation model accumulation module 108.

Figure 16:
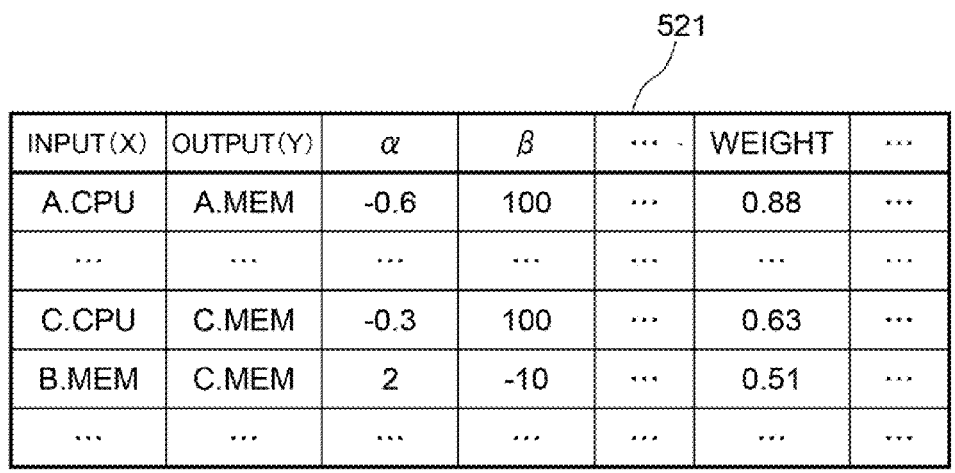
FIG. 16 is an explanatory illustration showing an example of a correlation model created by a correlation model generation module shown in FIG. 1.

FIG. 16 is an explanatory illustration showing an example of a correlation model 521 created by the correlation model generation module 107. In the case shown in FIG. 16, the correlation model generation module 107 takes "A. CPU" as an input X, for example, derives a conversion function "$Y=\alpha X+\beta$" of a case where "A. MEM" is taken as an output Y, refers to the time series of the values shown in the performance information 511 written in FIG. 15, determines "−0.6" and "100", respectively, for the values of $\alpha$ and $\beta$ of the conversion function, compares the time series of the values generated by the conversion function with the time series of the actual values of the performance information to be the output, and calculates the weight "0.88" of the conversion function from a conversion error that is the difference therebetween.

Similarly, the correlation model generation module 107 derives a conversion function between two arbitrary pieces of performance information, extracts the values with a specific weight as an effective correlation, and generates the overall correlation model 521 of an operating state of the service execution module 101 as shown in FIG. 16. Here, a case with the conversion function of "$Y=\alpha X+\beta$" which is a linear expression has been described. However, the conversion function is not to be limited only to such case. The conversion function derived by the correlation model generation module 107 may be any functions which convert the time series of the values of two arbitrary pieces of performance information. Further, to execute a calculation for regressing to such expression, a known statistical method can be utilized.

Then, the correlation change analysis module 109 analyzes whether or not the performance information acquired anew from the information collection module 103 matches with the correlation shown by the correlation model generated by the correlation model generation module 107. Regarding the performance information 511 shown in FIG. 15, for example, when acquired is the performance information 511 of the service execution module 101 at the point of "2007/11/07 8:30" on the lowermost row, the correlation model generation module 109 sequentially searches the conversion function written in the correlation model 521 shown in FIG. 16, judges that the correlation is maintained when the conversion value calculated by using the conversion function from the performance information of the service execution module 101 as an input and the newly acquired value of the performance information to be the output are within a specific conversion error range, and judges that the correlation becomes destroyed when the values exceed the conversion error range.

The correlation change analysis module 109 of the comparative example repeats the above-described processing on all the conversion functions of the service execution module 101 as the entire inputs, and judges occurrence of changes in the correlation of the entire performance information acquired anew. Thereafter, the correlation change analysis module 109 creates the correlation change information containing the abnormality degree information showing the degree of the correlation change and the abnormality element information showing the element related to the correlation change, and outputs the information to the failure analysis module 104.

The failure analysis module 104 receives the correlation change information. When the changed abnormality degree exceeds a value defined in advance, the failure analysis module 104 presents it to the administrator as a possible failure via the administrator interaction module 105.

Figure 17:
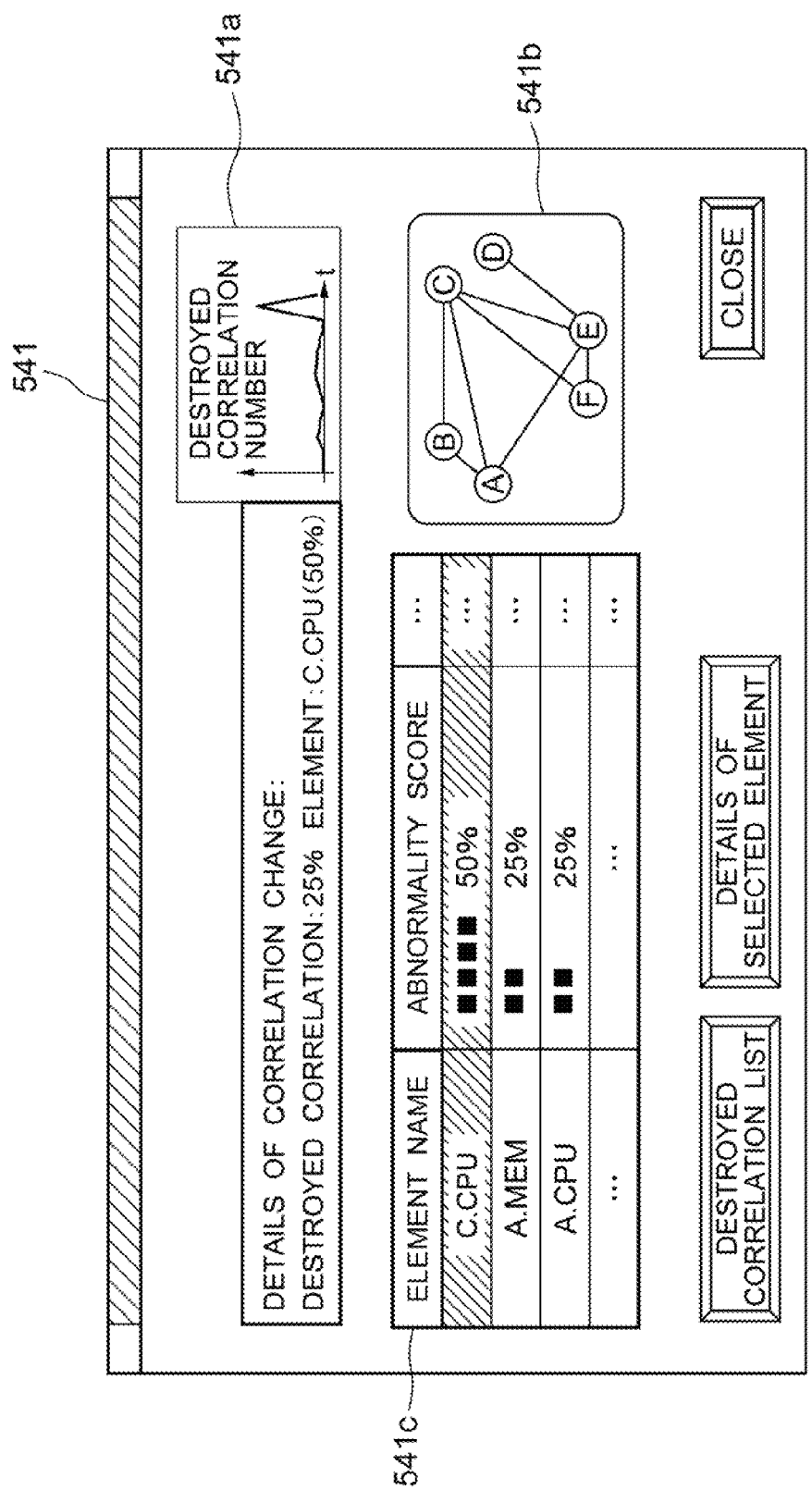
FIG. 17 is an explanatory illustration showing an example of a display screen that is presented to the administrator by an administrator interaction module shown in FIG. 1.

The administrator interaction module 105 in the operation management device according to the comparative example presents a display screen 541 as shown in FIG. 17 to the administrator. The display screen 541 includes correlation damaged number 541a showing the abnormality degree, correlation chart 541b showing an abnormality place, a list 541c of elements with a large abnormality degree, etc. In this manner, it is possible to present the administrator that there is a possibility of having a failure in the element "C. CPU" that has a large abnormality degree.

The operation management device according to the comparative example described above generates the correlation model from the performance information under a normal state where no failure is generated and calculates the proportion of changes in the detected performance information with respect to the correlation model of the normal state to detect generation of the performance abnormality such as a response deterioration so as to specify the failure place.

However, with the operation management device according to the comparative example described above, the presented information is the information of the element (the service execution module 101) whose behavior is different from that of the normal state. Thus, it is necessary for the administrator to do a work for finding the cause from the difference in the behavior in order to analyze which of the elements (the service execution modules 101) is the actual cause of the failure.

With the operation management device according to the comparative example described above, there is one abnormal element (the service execution module 101) in a case where one of the load-distributed servers (the service execution modules 101), for example, becomes abnormal or when there is a failure generated in a shared disk used by a plurality of servers (the server execution modules 101). However, the correlation between the performance information is damaged in a wide range. Further, in a system that includes a series of processing order such as a WEB 3-layer structure, processing abnormality may spread over a wide range of elements (the service execution modules 101) of latter stages after the abnormality is generated in a single element (the service execution module 101).

Therefore, with the operation management device according to the comparative example described above, the administrator needs to estimate the element (the service execution module 101) as the cause based on the destruction of the correlation by understanding the characteristic of the system that is actually operating. Particularly, in a system of complicated behaviors with a great number of structural elements such as a large-scaled system, the amount of knowledge required for the administrator is tremendous, and there is a risk of taking a wrong action due to a lack of knowledge.

(First Exemplary Embodiment)

Thus, the first exemplary embodiment according to the invention employs the structure where the abnormality degree analysis section 115 is provided to the control unit 114 as shown in FIG. 1 for overcoming the issues of the comparative example described above.

The abnormality degree analysis section 115 includes a failure period extraction module 110, an abnormality degree change information calculation module 111, a performance classification information accumulation module 112, and an abnormality degree distribution calculation module 113. Among those, the performance classification information accumulation module 112 is achieved by a nonvolatile storage module such as a disk device that is provided in advance to the operation management device 100. The failure period extraction module 110, the abnormality degree change information calculation module 111, and the abnormality degree distribution calculation module 113 are implemented on software by causing the CPU that configures the control unit 114 to execute a computer program. Note that the failure period extraction module 110, the abnormality degree change information calculation module 111, and the abnormality degree distribution calculation module 113 may also be built as hardware structures, even though those are implemented on software herein.

The failure period extraction module 110 receives the correlation change information from the correlation change analysis module 109, and extracts a failure period from the time series change of the abnormality degree based on a preset threshold value. The failure period extraction module 110 extracts the failure period from the time series change of the abnormality degree based on the preset threshold value by using the correlation change information received from the correlation change analysis module 109 by taking the start of the failure period as the point at which it is considered that the abnormality degree that can be generated under a normal operation changes to the abnormality degree judged as being a failure and by taking the end of the failure period as the point to which the abnormality degree that can be generated under the normal operation continues for a certain time.

The abnormality degree change information calculation module 111 receives the failure period information from the failure period extraction module 110, and calculates the abnormality degree change information including the statistical information such as the total amount, the maximum, the minimum, the average values and the like of the abnormality degrees within the failure period. The performance classification information accumulation module 112 accumulates the performance classification information which classifies the performance information collected from the service execution module 101 into a plurality of groups.

The abnormality degree distribution information calculation module 113 receives the performance classification information from the performance classification information accumulation module 112, extracts the performance information and the abnormality degree contained in the correlation changed in the failure period, and calculates the abnormality degree distribution information showing the distribution of the abnormality degree for each of the groups of the performance information.

As shown in FIG. 1, the failure analysis module 104 according to the first exemplary embodiment of the present invention receives the abnormality degree change information from the abnormality degree change information calculation module 111 and the abnormality degree distribution information from the abnormality degree distribution information calculation module 113 in addition to the information from the information collection module 103, and analyzes the failure of the service execution module 101 based on those pieces of information. The administrator interaction module 105 presents the abnormality degree change information and the abnormality degree distribution information for each failure period to the administrator based on the analyzed result from the failure analysis module 104.

Figure 2:
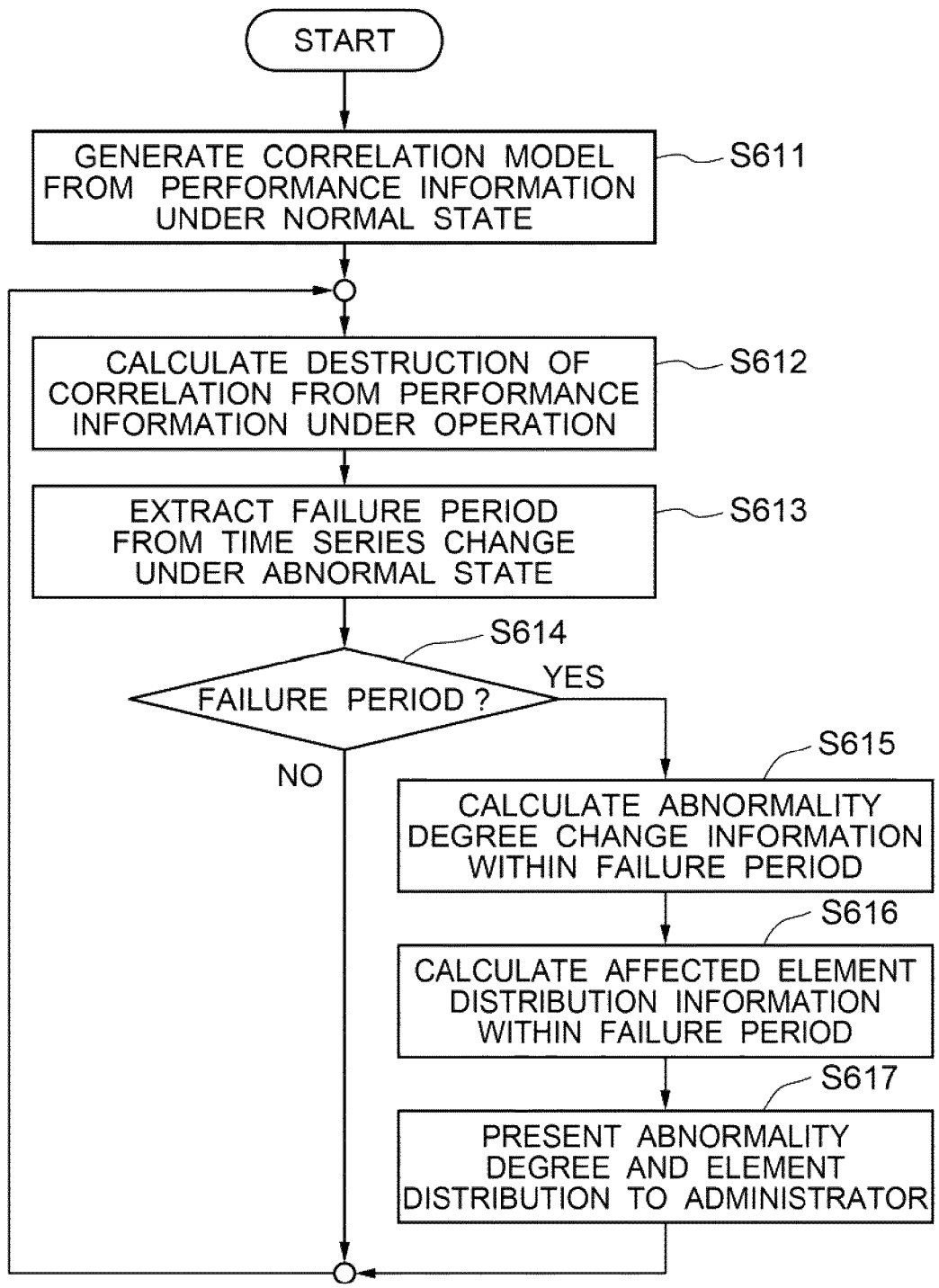
FIG. 2 is a flowchart showing actions of the operation management device shown in FIG. 1.

FIG. 2 is a flowchart showing a correlation change analyzing action performed in the operation management device 100 according to the first exemplary embodiment of the present invention shown in FIG. 1. The correlation model generation module 107 generates a correlation model based on the performance information that is collected by the information collection module 103 from the service execution module 101 (step S611). Further, when the information collection module 103 collects the performance information of an operation state, the correlation change analysis module 109 analyzes whether or not the performance information matches with the correlation shown in the correlation model, and calculates the abnormality degree from the change in the correlation (step S612).

The action of the operation management device 100 according to the first exemplary embodiment of the invention up to the steps described above is the same as that of the comparative example described above.

Next, the actions peculiar to the operation management device 100 according to the first exemplary embodiment of the invention will be described.

The failure period extraction module 110 extracts the failure period from the time series of the abnormality degree received from the correlation change analysis module 109 (step S613).

Figure 4:
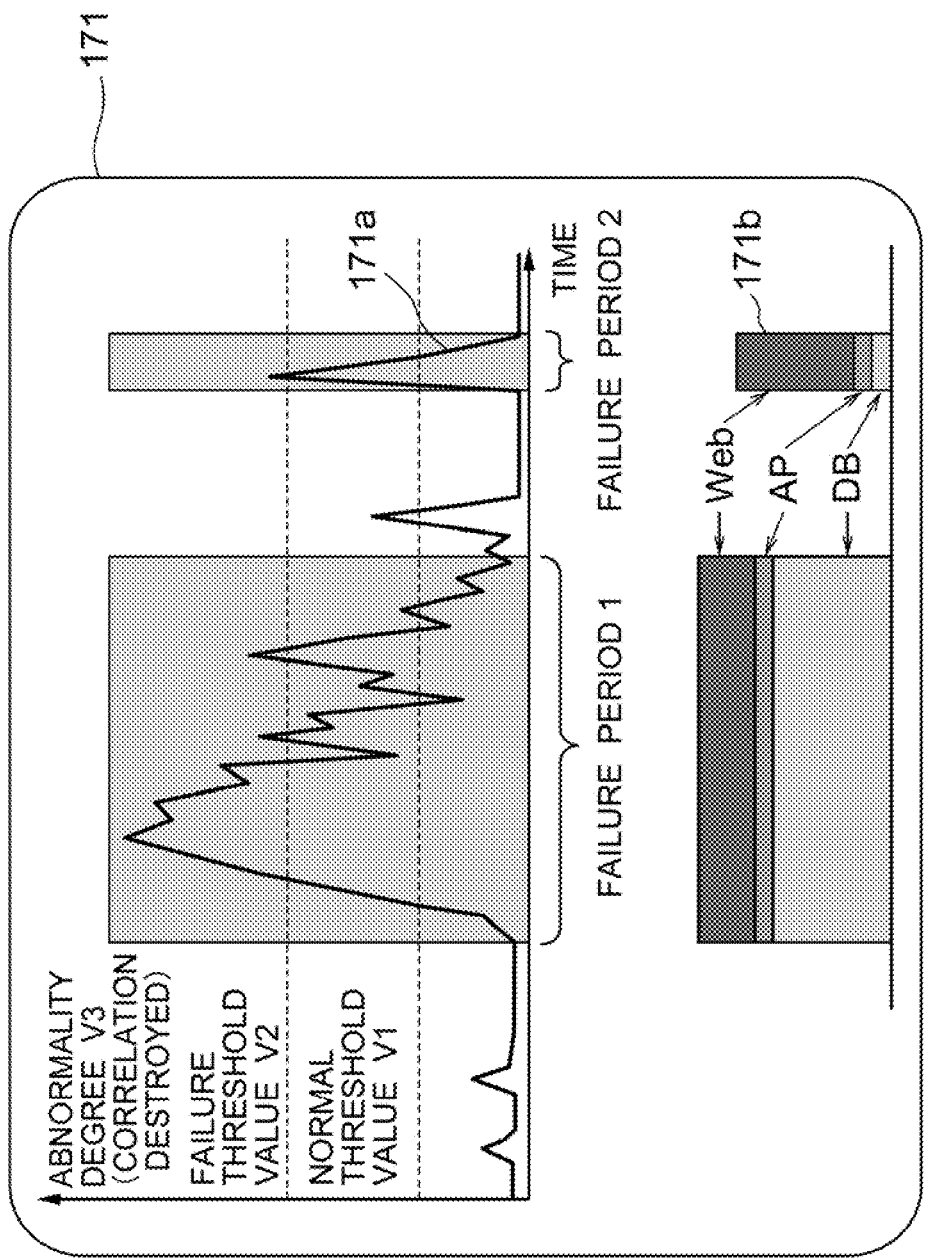
FIG. 4 is a graph showing an example of an abnormal degree distribution calculated by an abnormality degree change information calculation module and an abnormality degree distribution information calculation module.

In the case shown in FIG. 4, the failure period extraction module 110 extracts a failure period 1 and a failure period 2 from a graph 171a showing the time series change of the abnormality degree. Specifically, the failure period extraction module 110 extracts the failure periods 1 and 2 by using two threshold values of a normal threshold value V1 showing a border where the abnormality degree is considered as normal and a failure threshold value V2 showing a border where the abnormality is considered to show a failure state, while taking the point at which the abnormality degree changes from the abnormality degree of less than the normal threshold value V1 towards the abnormality degree V3 of equal to or larger than the failure threshold value (destroyed correlation) as the start and taking the point to which the abnormality degree of the normal threshold value V1 continues thereafter for a prescribed period as the end.

When the failure periods 1 and 2 are extracted in this manner by the failure period extraction module 110 (step S614), the abnormality degree change information calculation module 111 calculates the abnormality degree change information within the failure periods 1 and 2 extracted by the failure period extraction module 110 (step S615), and the abnormality degree distribution information calculation module 113 calculates the distribution information of the affected element (the service execution module 101) within the failure periods 1 and 2 extracted by the failure period extraction module 110 (step S616).

Next, actions executed by the abnormality degree change information calculation module 111 and the abnormality degree distribution information calculation module 113 will be described in details.

Figure 3:
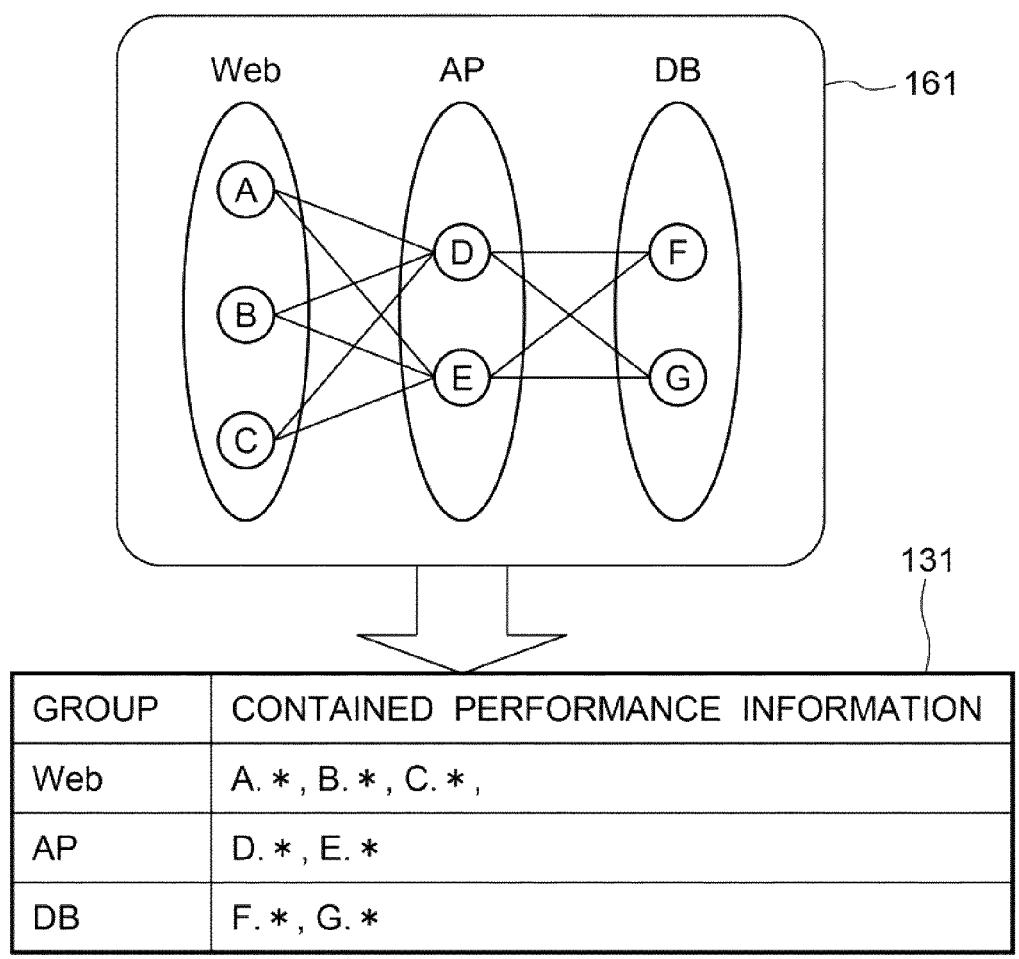
FIG. 3 is an explanatory illustration showing an example of performance classification information accumulated in a performance classification information accumulation module and a relation chart which classifies the performance information of each server.

As shown in FIG. 3, the performance classification information accumulation module 112 accumulates performance classification information 131 and a relation chart 161 which classifies the performance information of each server (each service execution module 101). The performance classification information 131 and the relation chart 161 shown in FIG. 3 are merely presented as examples thereof, and it is to be understood that those are not limited to the examples but may be changed in various ways depending on the systems that provide the services. In the relation chart 161 shown in FIG. 3, as in the structure of a typical WEB 3-layer system, seven servers (the service execution modules 101) of "A" to "G" are classified into three work groups of the servers of "Web (web servers)", the servers of "AP (application), and the servers of "DB (database)". In the performance classification information 131, the performance information of each of the servers (the service execution modules 101) is classified into three groups according to the classification of the groups classified in the relation chart 161.

In the case shown in FIG. 3, performance information of "A. *", "B. *", and "C. *" are contained in the "Web" group (the service execution modules 101), for example. "A. *" shows all the performance information of the server A (the service execution module 101) of the Web group. "B. *" shows all the performance information of the server B (the service execution module 101) of the Web group. "C. *" shows all the performance information of the server C (the service execution module 101) of the Web group.

Performance information of "D. *" and "E. *" is contained in the group of the "AP" servers. "D. *" shows all the performance information of the server D (the service execution module 101) of the AP group. "E. *" shows all the performance information of the server E (the service execution module 101) of the AP group.

Performance information of "F. *" and "G. *" is contained in the group of the "DB" servers. "F. *" shows all the performance information of the server F (the service execution module 101) of the DB group. "G. *" shows all the performance information of the server G (the service execution module 101) of the DB group.

The abnormality degree distribution information calculation module 113 classifies the performance information related to the phase changes within the failure periods 1, 2 extracted by the failure period extraction module 110 into the groups of the servers A to G according to the performance classification information 131 shown in FIG. 3, determines the distribution information of the abnormality degrees shown in the lower section of FIG. 4, i.e., the heights of the "Web" group, the "AP" group, and the "DB" group as the partial elements of a graph 171b written in the lower section of FIG. 4, by each of the failure periods 1, 2, and generates the stacked graph 171b showing the abnormality degree distribution of the partial elements in the failure periods 1, 2.

In the case shown in the lower section of FIG. 4, the abnormality degree distribution information calculation module 113 generates, as the abnormality degree distribution information of the partial elements shown in the failure period 1, the abnormality degree distribution information where the correlation change regarding the "DB" group occupies a majority part, the correlation change regarding the "Web" group occupies a next greater amount, and the correlation change regarding the "AP" group occupies the least. Further, the abnormality degree distribution information calculation module 113 generates, as the abnormality degree distribution information of the partial elements shown in the failure period 2, the abnormality degree distribution information where the correlation change regarding the "Web" group occupies the majority, and the correlation changes regarding the "AP" group and the "DB" group occupy the minority.

In the case shown in the lower section of FIG. 4, the abnormality degree change information calculation module 111 receives the information from the failure period extraction module 110, determines the levels of the abnormality degrees of all the elements ("Web" group, "AP" group, and "DB" group) in the failure periods 1, 2 extracted by the failure period extraction module 110 based on the statistical values, and calculates the abnormality degrees of all the elements in the failure periods 1, 2.

The ranges of the failure periods 1, 2 handled by the abnormality degree change information calculation module 111 and the abnormality degree distribution information calculation module 113 are determined by the abnormality degree change information calculation module 111 and the abnormality degree distribution information calculation module 113 according to the failure periods 1, 2 which are extracted by the failure period extraction module 110 based on the graph 171a.

The failure analysis module 104 receives the abnormality degree change information calculated by the abnormality degree change information calculation module 111 and the abnormality degree distribution information calculated by the abnormality degree distribution information calculation module 113, analyzes the operation state of the service execution module 101 based on those pieces of information, and outputs the analyzed result to the administrator interaction module 105. The administrator interaction module 105 receives the analyzed result acquired by the failure analysis module 104, and presents the analyzed result to the administrator (step S617).

Figure 5:
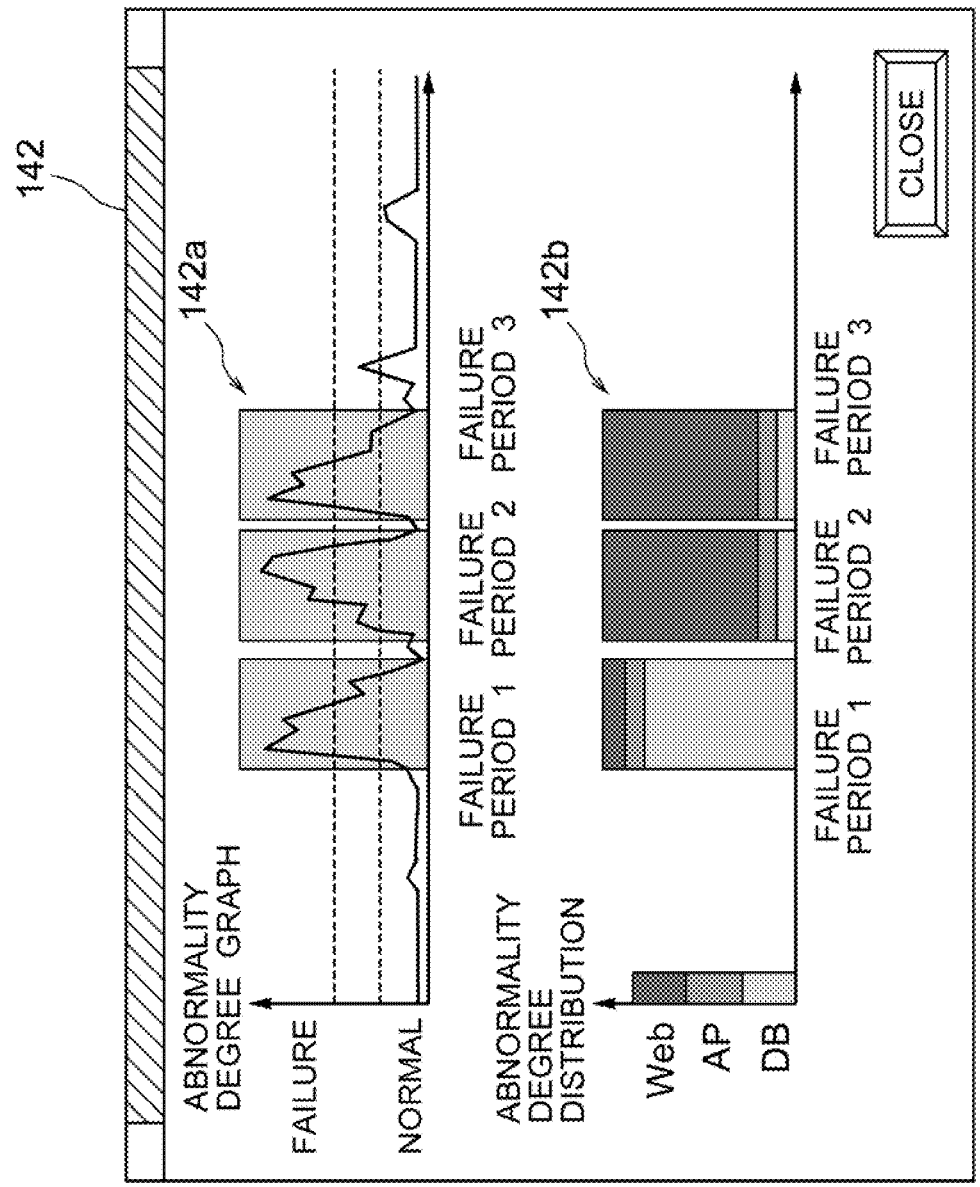
FIG. 5 shows an example of a display screen that is presented to an administrator by an administrator interaction module shown in FIG. 1.

FIG. 5 shows an example of a display screen 142 that is presented by the administrator interaction module 105 to the administrator. As shown in the upper section of FIG. 5, the administrator interaction module 105 displays, on the display screen 142, a failure period 1 to a failure period 3 extracted by the failure period extraction module 110 on an abnormality degree graph 142a that is the time series of the abnormality degrees outputted from the correlation change analysis module 109. Further, as shown in the lower section of FIG. 5, the administrator interaction module 105 displays an abnormality degree distribution 142b in each of the failure periods 1 to 3 calculated by the abnormality degree distribution information calculation module 113 in the same time series as that of the abnormality degree graph 142a.

In a case where the time series change abnormality degree graph showing the result of analysis on the abnormality degrees based on the correlation changes done by the correlation change analysis module 109 is not the graph shown in FIG. 4 but the abnormality degree graph 142a as shown in the upper section of FIG. 5, the failures in each of the failure periods 1 to 3 continue in the similar abnormality degree and period in the time series change of an abnormality degree graph 142a as shown in the upper section of FIG. 5. Particularly, the failure in the failure period 1 and the failure in the failure period 3 are shown in similar waveforms. Therefore, in a case where the result of analysis acquired by the correlation change distribution analysis module 109 is directly outputted to the failure analysis module 104 to analyze the failure in the failure analysis module 104, and the failure state is displayed for the administrator only with the abnormality degree graph 142a shown in the upper section of FIG. 5 as in the case of the comparative example, there is a great possibility for the administrator not to be able to know the failures correctly, e.g., the administrator may misunderstand that the failures of the failure periods 1 to 3 as a series of failures, or the administrator may predict that the failure only in the failure period 2 is in a state different from those of the other failure periods 1, 3.

In the meantime, as described above, the first exemplary embodiment of the invention includes the failure period extraction module 110, the abnormality degree change information calculation module 111, and the abnormality degree distribution information calculation module 113. Further, the failure analysis module 104 receives the abnormality degree change information calculated by the abnormality degree change information calculation module 111 and the abnormality degree distribution information calculated by the abnormality degree distribution information calculation module 113, analyzes the operation state of the service execution module 101 based on those pieces of information, and gives the analyzed result to the administrator interaction module 105.

Therefore, referring to the abnormality degree distribution 142b shown in the lower section of FIG. 5, the abnormality degree change information calculated by the abnormality degree change information calculation module 111 and the abnormality degree distribution information calculated by the abnormality degree distribution information calculation module 113 are displayed as the stacked graph in the abnormality degree distribution 142a. Thus, the administrator can understand that the failure related to the "WEB" group is continuously generated in the failure periods 2, 3 after there is a failure related to the "DB" group generated in the failure period 1. Therefore, the administrator can grasp the state more accurately based on the display of the abnormality degree distribution 142a shown in the lower section of FIG. 5, and take an appropriate command. This makes it possible for the administrator to check the failure state of the "DB" group generated in the first failure period 1 in details for finding the causes, for example, and to check the contents of the failures in the failure periods 2, 3 for investigating the affected range.

Next, the overall actions of the first exemplary embodiment will be described. When the performance information for each of a plurality of kinds of performance items is acquired from a single or a plurality of managed devices configuring the system and the managed devices are operated and managed, assuming that the performance items or the managed devices are elements, the information collection module 103 collects at least the first performance information showing the time series change of the performance information regarding a first element and the second performance information showing the time series change in the performance information regarding a second element from the elements, and the correlation model generation module 102 derives a correlation function between the first and the second performance information and generates a correlation model based on the correlation function (FIG. 2: step S611). The correlation change analysis module 109 calculates the destruction in the correlation from the performance information of an operation state, and then the failure period extraction module 110 extracts a failure period from the time series change of an abnormal state. When there is a failure period, the abnormality degree change information calculation module 111 calculates the abnormality degree change information within the failure period (step S615 of FIG. 2), and the abnormality degree distribution information calculation module 113 calculates the distribution information of the affected element (the service execution module 101) within the failure period, and presents the abnormality degree and the distribution of the element (the service execution module 101) to the administrator (step S617 of FIG. 2).

Note here that the steps of each of the above-described actions may be put into programs that can be executed by a computer, and those programs may be executed by the operation management device 100 that is a computer directly executing each of those steps.

With the exemplary embodiment, the failure period extraction module 110 extracts the failure period from the time series change of the abnormality degree, and the abnormality degree change information calculation module 111 and the abnormality degree distribution information calculation module 113 generate outline information of the correlation changes within the failure period. Thereby, the administrator can accurately grasp the outline regarding which of the periods has the failure or what kind of failure it is.

The operation management device 100 according to the exemplary embodiment specifies the failure period based on the matching level with respect to the correlation model showing the correlation in a normal state. Thus, in a case where the judgment value is small (the matching level is high), it is shown that the behavior in the system returned to the normal state, so it is possible to clearly discriminate the abnormal period from the normal period compared to a case of making judgments only with the threshold values for the performance information.

Further, the operation management device 100 according to the exemplary embodiment is capable of detecting not only the abnormal values for each of the individual elements but also the abnormality such as bottleneck caused due to the relation of the performance values of other elements that are in a relation of input and output. Since it is possible to accurately show the administrator which of the elements the failure is related, the administrator can take an efficient command by reducing mistakes.

In the above, there has been described by referring to the case of presenting the abnormality distribution of each group in the stacked graph. However, the exemplary embodiment is not limited only to such case. The same effects can be achieved by using other methods as long as the detailed breakdown of the abnormal elements within the failure period can be presented therewith. Further, while there has been described by referring to the case of plotting the failure periods on a graph on a displayed screen, the exemplary embodiment is not limited only to such case. It is possible to employ a command which issues a message showing the start and end of the failure, and presents the information or takes a command by utilizing a function of analyzing events executed by the failure analysis module 104. In this case, it is also possible to achieve the effect of accurately specifying the performance failure by specifying the failure period from the correlation change.

(Second Exemplary Embodiment)

An operation management device 200 according to a second exemplary embodiment of the invention further includes, in addition to the case of the first exemplary embodiment, a failure analysis module 104 which detects generation of failures from first and second performance information, and a performance classification information generation module 216 which classifies, from a correlation model, the performance information according to the strength in the correlation between the performance information and the pattern of the related elements to generate the performance classification information.

Further, the operation management device 200 includes: a past failure information accumulation module 214 which accumulates the history of failures analyzed by the failure analysis module 104; and a similar failure search module 215 which searches the failure similar to the abnormality degree change information and the abnormality degree distribution information by comparing the information stored in the past failure information accumulation module 214 with the abnormality degree change information calculated by the abnormality degree change information calculation module 111 and the abnormality degree distribution information calculated by the abnormality degree distribution information calculation module 113, respectively.

With such structure, the operation management device 200 can automatically generate the groups of the performance information and search the similarity. Therefore, it becomes unnecessary for the administrator to generate the performance classification information, so that the load thereof can be decreased.

Figure 6:
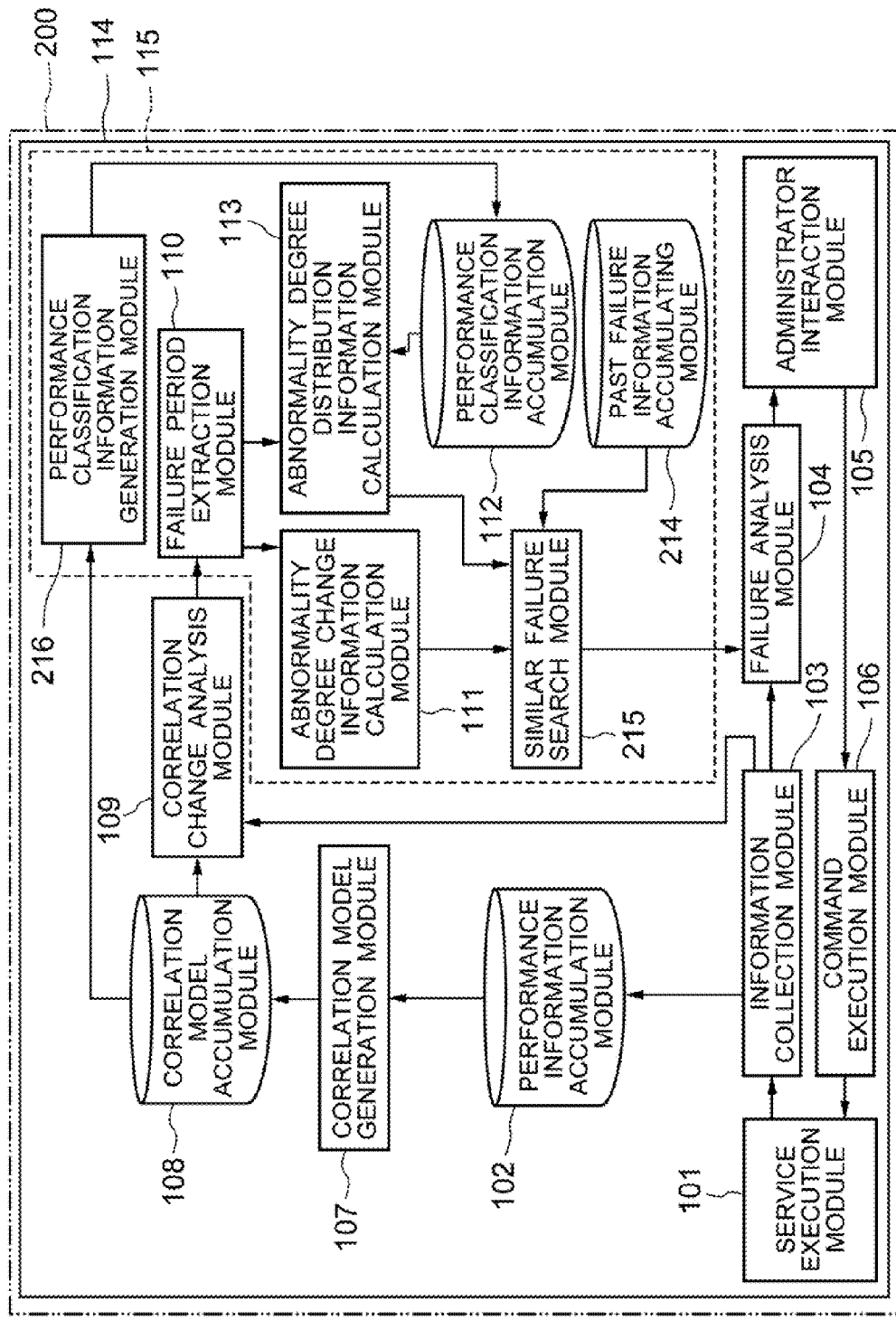
FIG. 6 is an explanatory illustration showing the structure of an operation management device according to a second exemplary embodiment of the invention.

Hereinafter, this will be described in more details. FIG. 6 is an explanatory illustration showing the structure of the operation management device 200 according to the second exemplary embodiment of the invention. In addition to the structure of the operation management device 100 according to the first exemplary embodiment described in FIG. 1, it is a feature of the operation management device 200 to be formed by providing the past failure information accumulation module 214, the similar failure search module 215, and the performance classification information generation module 216 in the abnormality degree analysis section 115. The failure analysis module 104 is included in the operation management device 100 of the first exemplary embodiment, so that it is also included in the operation management device 200.

Among those, the past failure information accumulation module 214 is achieved by a nonvolatile storage module such as a disk device which is provided in advance to the operation management device 200. The other structural elements are of the same actions and effects in common to those of the operation management device 100 according to the first exemplary embodiment, so that the same element names and reference numerals are to be applied.

The past failure information accumulation module 214 accumulates the history of the failures analyzed by the failure analysis module 104. The similar failure search module 215 receives the abnormality degree change information and the abnormality degree distribution information, respectively, from the abnormality degree change information calculation module 111 and the abnormality degree distribution information calculation module 113, and searches the similar failure from the past failure information accumulation module 214.

The performance classification information generation module 216 reads out the correlation model from the correlation model accumulation module 108, and classifies the performance information from the strength of the correlation between the performance information and the pattern of the related elements to generate the performance classification information.

Figure 7:
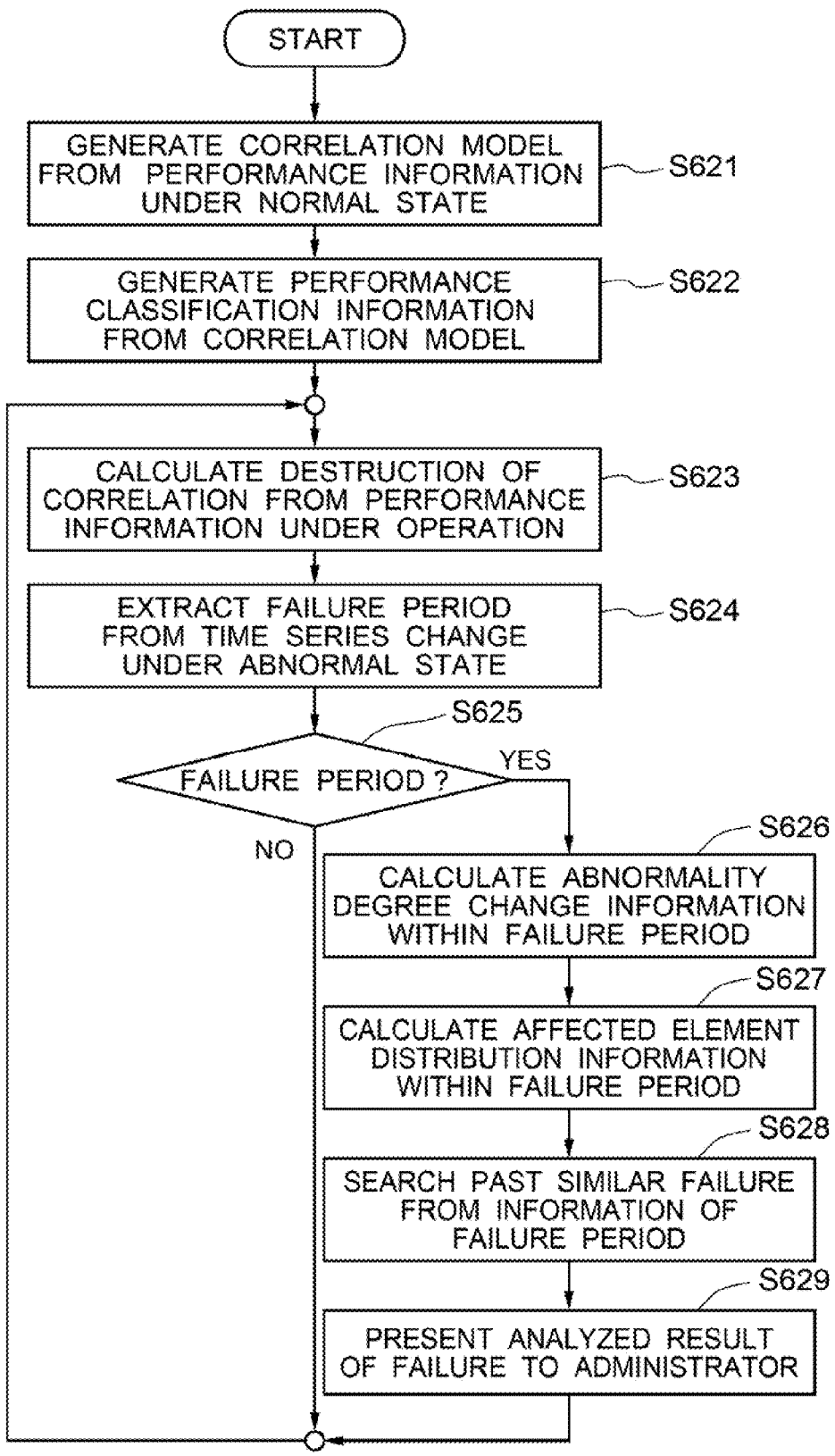
FIG. 7 is a flowchart showing actions of the operation management device shown in FIG. 6.

FIG. 7 is a flowchart showing the actions of the operation management device 200 shown in FIG. 6. The actions of the operation management device 200 according to the exemplary embodiment further includes steps S622 and S628 to be described next in addition to the actions of the operation management device 100 of the first exemplary embodiment shown in FIG. 2.

After generating the correlation model (step S621) in the same manner as that of the first exemplary embodiment, the performance classification information generation module 216 reads out the correlation model from the correlation model accumulation module 108, and classifies the performance information from the strength of the correlation between the performance information and the pattern of the related elements to generate the performance classification information (step S622).

The performance classification information generation module 216 classifies the performance information of the service execution module 101 by using a typical classifying method. However, in a case where the performance information exhibits a specific relationship, the performance information may be classified by estimating the groups of system structures from the behaviors thereof. For example, in a case of server groups where the load is distributed to the service execution modules 101, inputs and the processing amounts of each module are in equivalent values under a state where a steady load of some extent is to be imposed. Thus, there is a mutually strong correlation generated in the server group. Further, in a case where there is a flow in the processing as in the case where the service execution modules 101 are the "Web" servers and the "AP" servers, the relation in order of the time series from the earlier stage to the latter stage is clear. However, it is considered to exhibit such a characteristic that the inverse relation becomes weak, for example. Moreover, there may be cases of an inverted relation, total values, and the like, as in a relation of a used memory and an unused memory. The performance classification information generation module 216 generates the performance information classification information of the service execution modules 101 by considering the information described above.

Then, after processing of steps S623 to 626 (correspond to the steps S612 to 615) is performed in the same manner as that of the first exemplary embodiment, the abnormality degree distribution information calculation module 113 calculates the abnormality degree distribution information by using the performance classification information generated by the performance classification information generation module 216 (step S627).

Further, the similar failure search module 215 receives the abnormality degree change information calculated by the abnormality degree change information calculation module 111 and the abnormality degree distribution information calculated by the abnormality degree distribution information calculation module 113, searches a case of similar abnormality degree change or a similar abnormality degree distribution from the failure cases of the past accumulated in the past failure information accumulation module 214, and outputs the contents thereof (step S628). The failure analysis module 104 analyzes the failure based on the information searched by the similar failure search module 215 and the information acquired by the information collection module 103, and presents the failure contents analyzed in this manner to the administrator as the analyzed result via the administrator interaction module 105 (step S629).

As described, with the exemplary embodiment, the performance classification information generation module 216 automatically generates the group of the performance information of the service execution modules from the correlation contained in the correlation model. Therefore, the load imposed on the administrator who generates the performance classification information to classify the performance information of the service execution modules can be reduced greatly.

Further, with the exemplary embodiment, the similar failure search module 215 searches the past cases according to the abnormality degree change and the abnormality distribution of the extracted failure period. In that case, a general-purpose operation management device uses an error message and the like generated at the time of failure for searching the failure case. Thus, for searching the similar information regarding the information that changes continuously such as the performance information, it is necessary to perform processing of a large load such as searching of a multidimensional space. In the meantime, with the exemplary embodiment, the information as a key to search the past cases is generated as the failure period and the abnormality degree distribution. Therefore, it is possible to search the similarity in the performance information without increasing the processing load.

(Third Exemplary Embodiment)

An operation management device 300 according to a third exemplary embodiment of the invention includes, in addition to the case of the second exemplary embodiment, a failure element estimation module 317 which predicts, for each of elements (service execution modules 101), an abnormality degree distribution pattern assumed in a case where there is a failure generated in an element and it affects the other elements (the service execution modules 101) based on the correlation model and the classification information as well as order information contained in the performance information, and compares the abnormality degree distribution information with the abnormality degree distribution pattern to estimate which of the element the failure is generated.

With such structure, the operation management device 300 can estimate the element of the generated failure accurately, thereby making it possible to decrease mistakes in commands and to achieve commands more efficiently.

Figure 8:
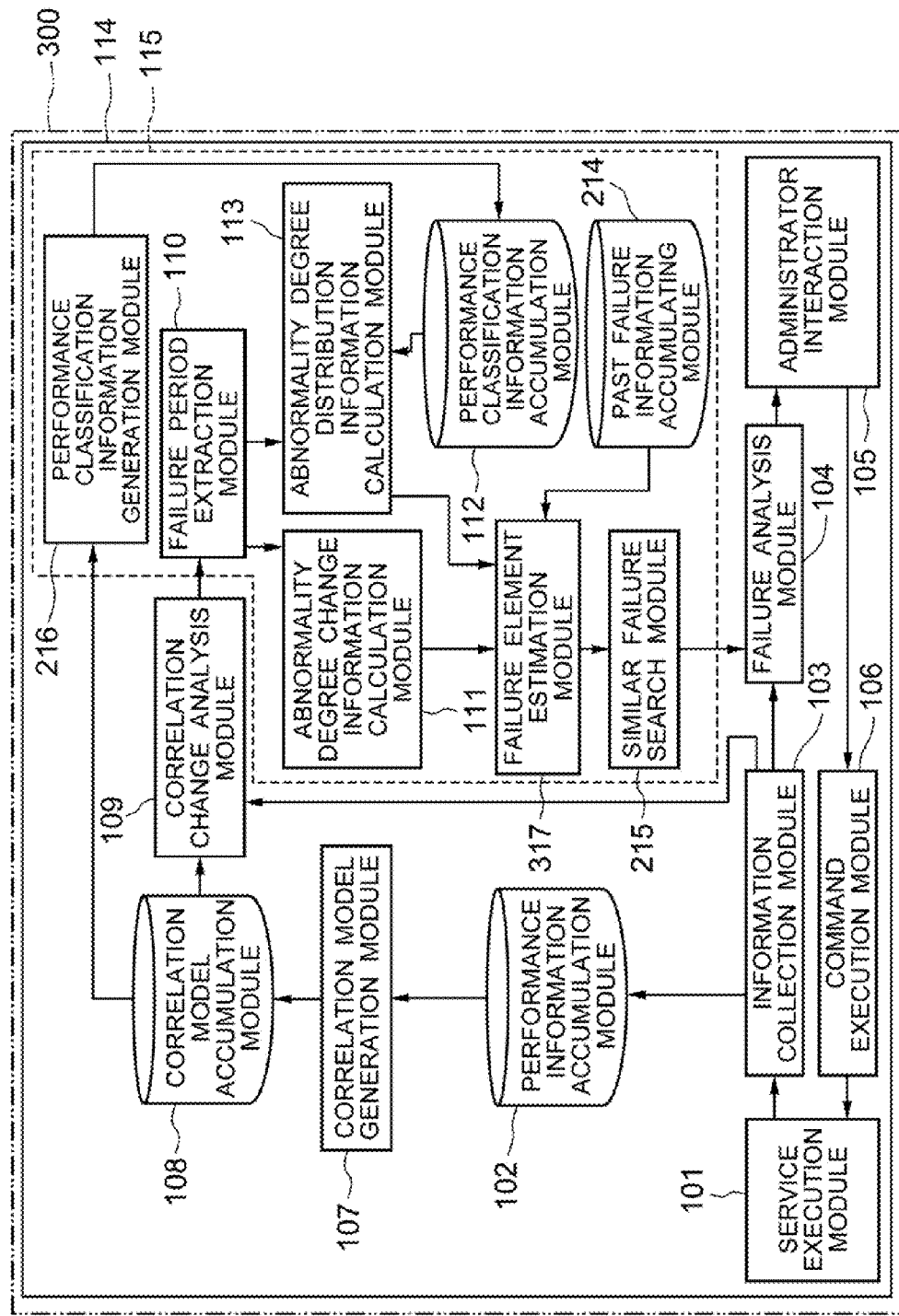
FIG. 8 is an explanatory illustration showing the structure of an operation management device according to a third (and a fourth) exemplary embodiments of the invention.

Hereinafter, this will be described in more details. FIG. 8 is an explanatory illustration showing the structure of the operation management device 300 according to the third exemplary embodiment of the invention. The operation management device 300 is formed by providing the failure element estimation module 317 in the abnormality degree analysis section 115, in addition to the structure of the operation management device 200 according to the second exemplary embodiment described by referring to FIG. 6. Further, the performance classification information accumulated in the performance classification information accumulation module 112 holds the order information showing the processing order among the groups, in addition to the classification information showing the groups of the performance information. The other structural elements are of the same actions and effects in common to those of the operation management device 200 according to the second exemplary embodiment except for the aspects described next, so that the entirely same element names and reference numerals are to be applied.

The failure element estimation module 317 receives the correlation model and the classification information as well as the order information contained in the performance classification information accumulated in the correlation model accumulation module 108 and the performance classification accumulation module 112, and predicts, for each of the elements (the service execution modules 101) within the system, an abnormality degree distribution pattern assumed in a case where there is a failure generated in each element and it affects the other elements (the service execution modules 101). Further, the failure element estimation module 317 receives the abnormality degree distribution information from the abnormality degree distribution information calculation module 113, and compares the abnormality degree distribution information with the abnormality degree distribution pattern predicted by itself to estimate which of the element within the system the failure is generated.

The similar failure search module 215 additionally has a function of conducting a search by including the information of the failure element that is estimated by the failure element estimation module 317 when searching the past cases. The failure analysis module 104 additionally has a function of presenting the analyzed result to the administrator via the administrator interaction module 105.

Figure 9:
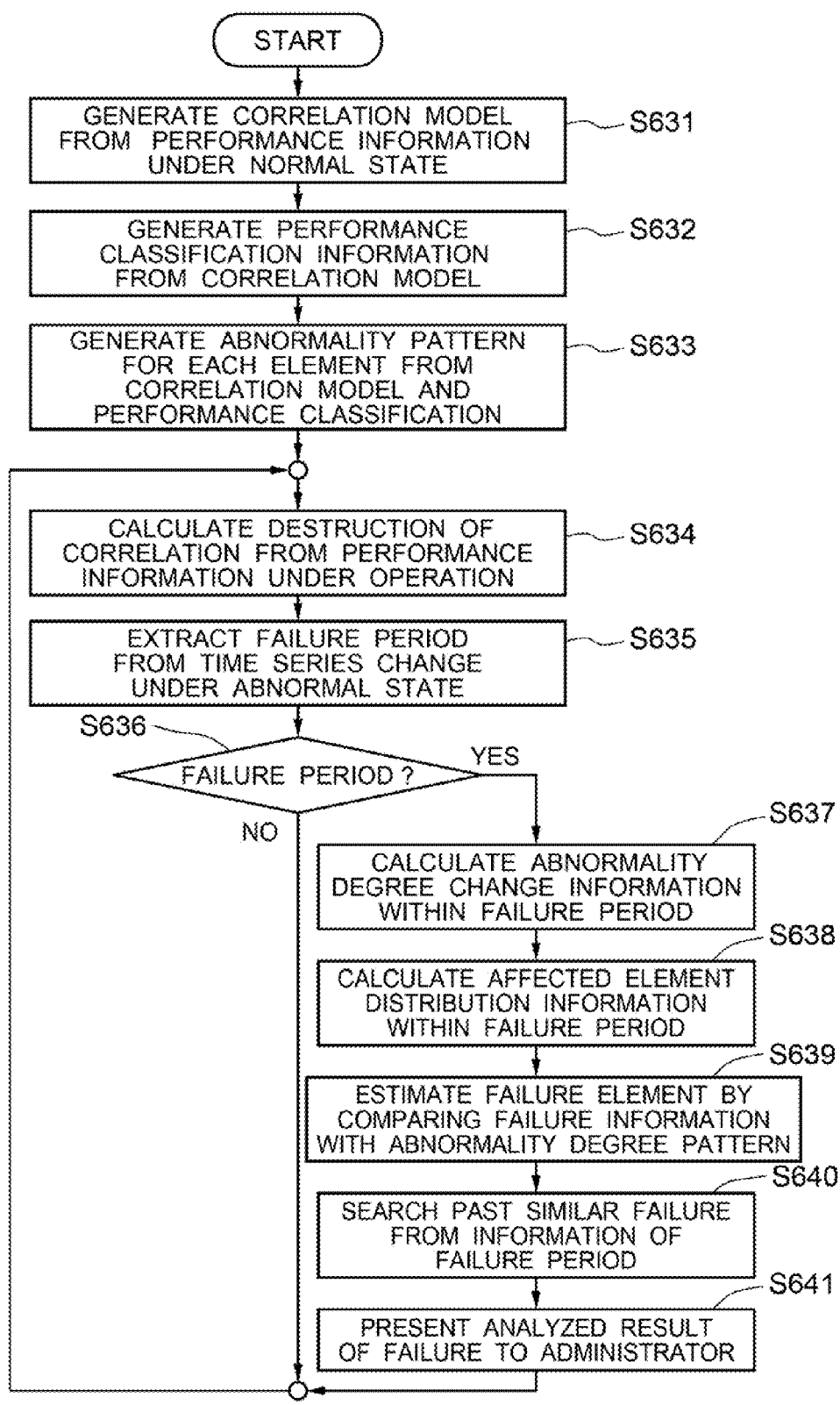
FIG. 9 is a flowchart showing actions of the operation management device shown in FIG. 8.

FIG. 9 is a flowchart showing actions of the operation management device 300 shown in FIG. 8. The actions of the operation management device 300 according to the exemplary embodiment include steps S633 and S639 described hereinafter, in addition to the actions of the operation management device 200 according to the second exemplary embodiment shown in FIG. 7.

As in the case of the second exemplary embodiment, after the correlation model is generated (step S631) and the performance classification information is generated (step S632), the failure element estimation module 317 compares the correlation model read out from the correlation model accumulation module 108 with the performance classification information read out from the performance classification information accumulation module 112 to predict, for each of the elements within the system, the abnormality degree distribution pattern estimated when each element becomes a failure (step S633).

Figure 10:
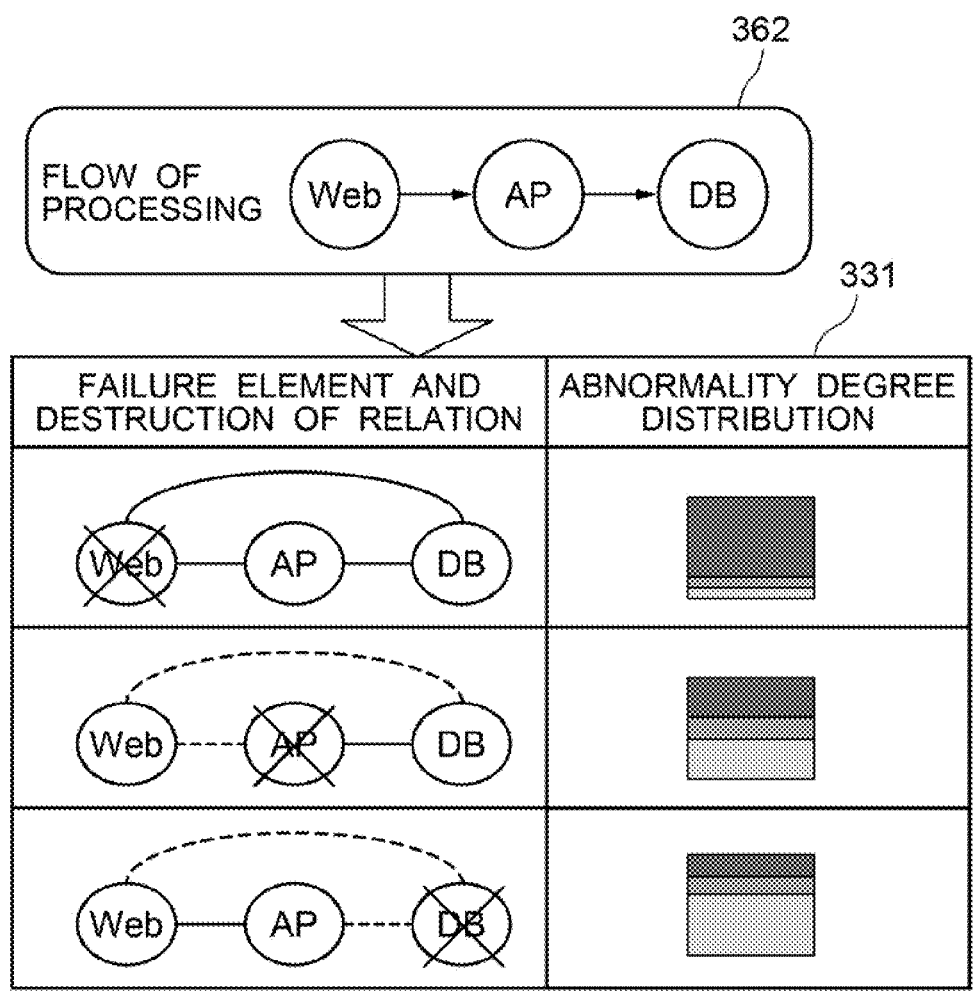
FIG. 10 is an explanatory illustration showing an outline of the actions of a failure element estimation module shown in FIG. 8.

FIG. 10 is an explanatory illustration showing the outline of the actions of the failure element estimation module 317 shown in FIG. 8. In a relation chart 362 shown in FIG. 10, arrows showing the processing order among each of the groups are added in addition to the group classification of the relation chart 161 shown in FIG. 3. An abnormality pattern 331 shows an example of the abnormality degree distribution pattern estimated by the failure element estimation module 317. The abnormality degree pattern 331 is the pattern that is calculated in advance regarding which of the correlation is to be destroyed when the correlation contained in the correlation model is searched from the performance information of the failure element according to the processing order among the groups in a case where a given element within the system has a failure.

For example, when there is an abnormality generated in a server of the "Web" group, the correlation with respect to the other servers contained in the "Web" group is destroyed. However, under a state where the Web server does not execute processing, there is no input to the AP server and the DB server of the latter stages. Thus, the correlation among the performance information can be maintained correctly, while the processing is not executed. Thus, regarding the abnormality distribution, there is a greater correlation change in the "Web" group with a greater number of servers, whereas there is a smaller correlation change in the other groups. Abnormality degree distribution patterns of cases where there is a failure generated in the server of the "AP" group or in the server of the "DB" group are predicted in the same manner.

Returning to FIG. 9, then, after the processing of steps S634 to 638 (correspond to steps S623 to 627 of FIG. 7) is performed in the same manner as that of the second exemplary embodiment, the failure element estimation module 317 compares the abnormality degree distribution information received from the abnormality degree distribution information calculation module 113 with the abnormality degree distribution pattern predicted in step S633 to estimate which of the element within the system has a failure (step S639).

Thereafter, the similar failure search module 215 searches the past cases by including the estimation result (step S640), and the failure analysis module 104 presents the failure contents analyzed in this manner to the administrator via the administrator interaction module 105 (step S641).

Figure 11:
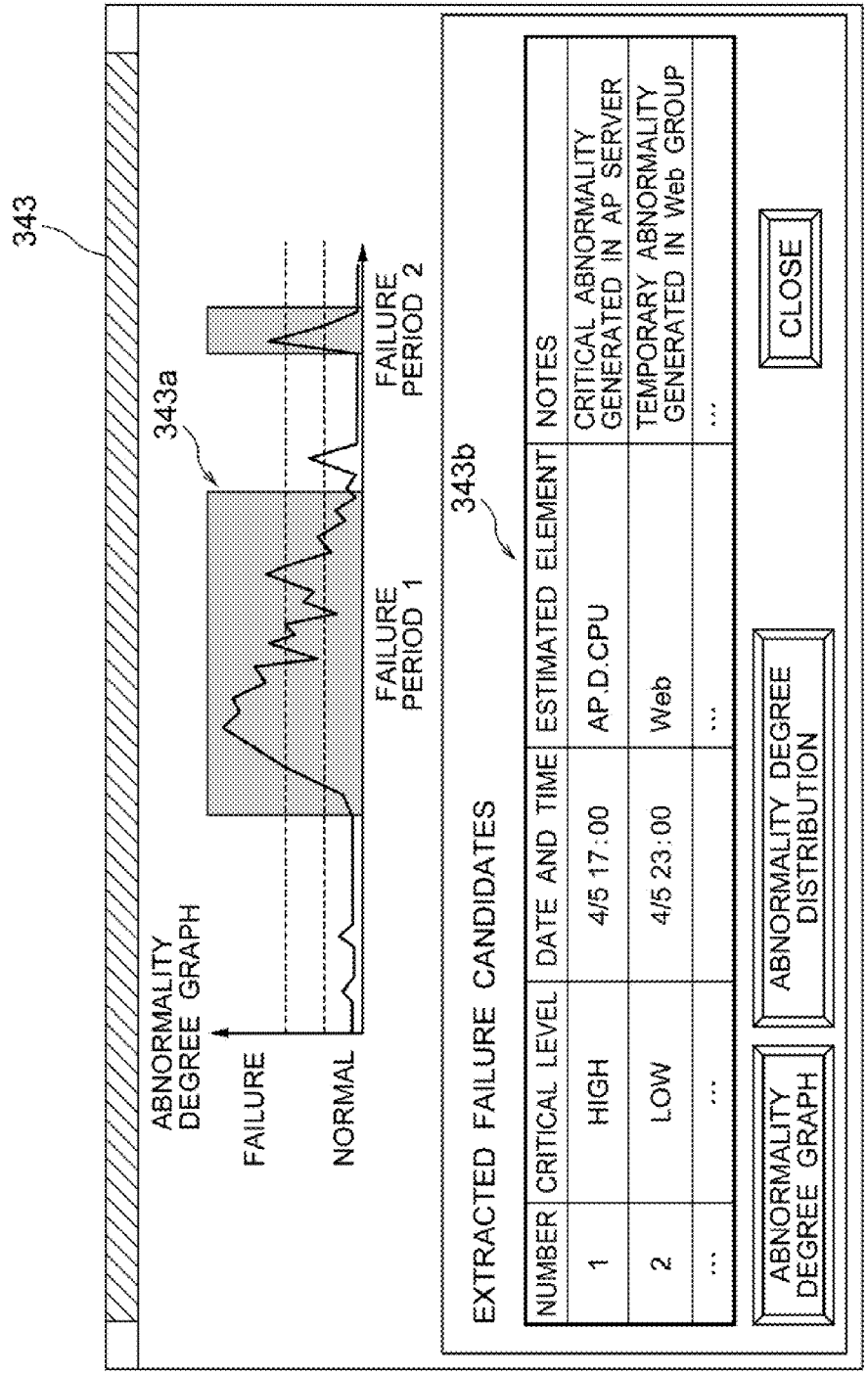
FIG. 11 is an example of a display screen that is presented to the administrator by a failure analysis module shown in FIG. 8.
Figure 12:
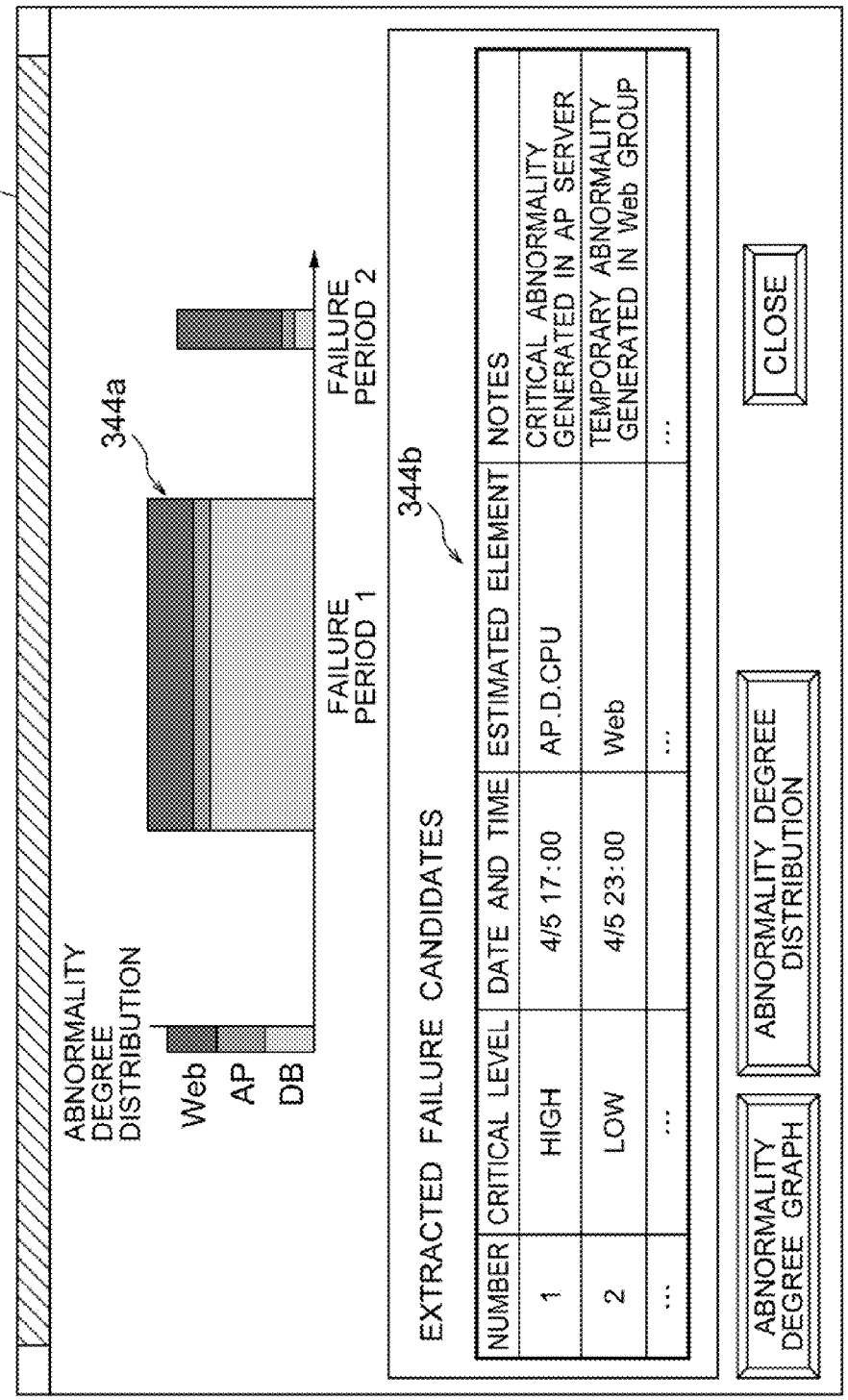
FIG. 12 is another example of the display screen that is presented to the administrator by the failure analysis module shown in FIG. 8.

FIG. 11 and FIG. 12 are explanatory illustrations showing examples of display screens 343 and 344 which are presented to the administrator by the failure analysis module 104 shown in FIG. 8 in this manner. As in the case of the display screen 142 of FIG. 5, an abnormality degree graph 343a is illustrated on the display screen 343 of FIG. 11, and a stacked graph 344a of the abnormality degree distribution is illustrated on the display screen 344 of FIG. 12.

Further, on the display screens 343, 344 of FIG. 11, FIG. 12, lists 343b, 344b of extracted failure candidates are presented. In that case, presented thereon is that it is estimated as a failure of the AP server as a result of comparing the abnormality degree distribution information of failure 1 shown on the display screen 344 with the abnormality degree pattern 331 of FIG. 10 estimated by the failure element estimation module 317, that the importance level is "high" from the extent of the abnormality degree change information, and that "AP. D. CPU" which are the elements with a large abnormality degree are estimated as the abnormality elements. Similarly, failure 2 is estimated as a failure of the "Web" group whose importance level is "low". While the information of the similar failures is omitted on the display screens 343 and 344, such information can also be presented as detailed information of the failure candidates.

As described above, with the exemplary embodiment, the failure element estimation module 317 predicts the abnormality degree pattern of a case where the element within the system has a failure, and compares it with the calculated abnormality degree distribution information. Thereby, the estimation result indicating which of the elements has the failure can be presented to the administrator. For example, in the distribution of the failure 1 of FIG. 12, the number in the "AP" group is small, and there are more in the other groups. Thus, there is a risk that the administrator misrecognizes it as the failure in the other groups. However, with the exemplary embodiment, it is possible to present the estimation result indicating that it is the failure of the "AP" group in the case of this distribution to the administrator through following the correlation according to the processing order. This makes it possible to decrease mistakes in commands and to achieve commands more efficiently.

(Fourth Exemplary Embodiment)

An operation management device 400 according to a fourth exemplary embodiment of the invention is a device in the same structure as that of the operation management device 300 according to the third exemplary embodiment, and the failure period extraction module classifies the failure period into a failure start period, a failure continuing period, and a failure end period.

With such structure, the operation management device 400 can present the cause and the influence of the failure to the administrator accurately.

Hereinafter, this will be described in more details. The structure of the operation management device 400 according to the fourth exemplary embodiment of the invention is the same as the structure of the operation management device 300 according to the third exemplary embodiment described by referring to FIG. 8. Thus, explanations thereof will be continued by simply substituting "400" to "300" of FIG. 8. Note, however, that the failure period extraction module 110 of the operation management device 400 additionally has a function of dividing the failure period into a failure start period in which a value of equal to or less than a normal threshold value continuously increases to a value of equal to or larger than a failure threshold value, a failure end period in which the value of equal to or less than the normal threshold value continues for a specific number after the failure start period, and a failure continuing period sandwiched between the failure start period and the failure end period. Further, the abnormality degree change information calculation module 111 and the abnormality degree distribution information calculation module 113 additionally have functions of calculating the abnormality degree change information and the abnormality degree distribution information of each period, respectively.

Figure 13:
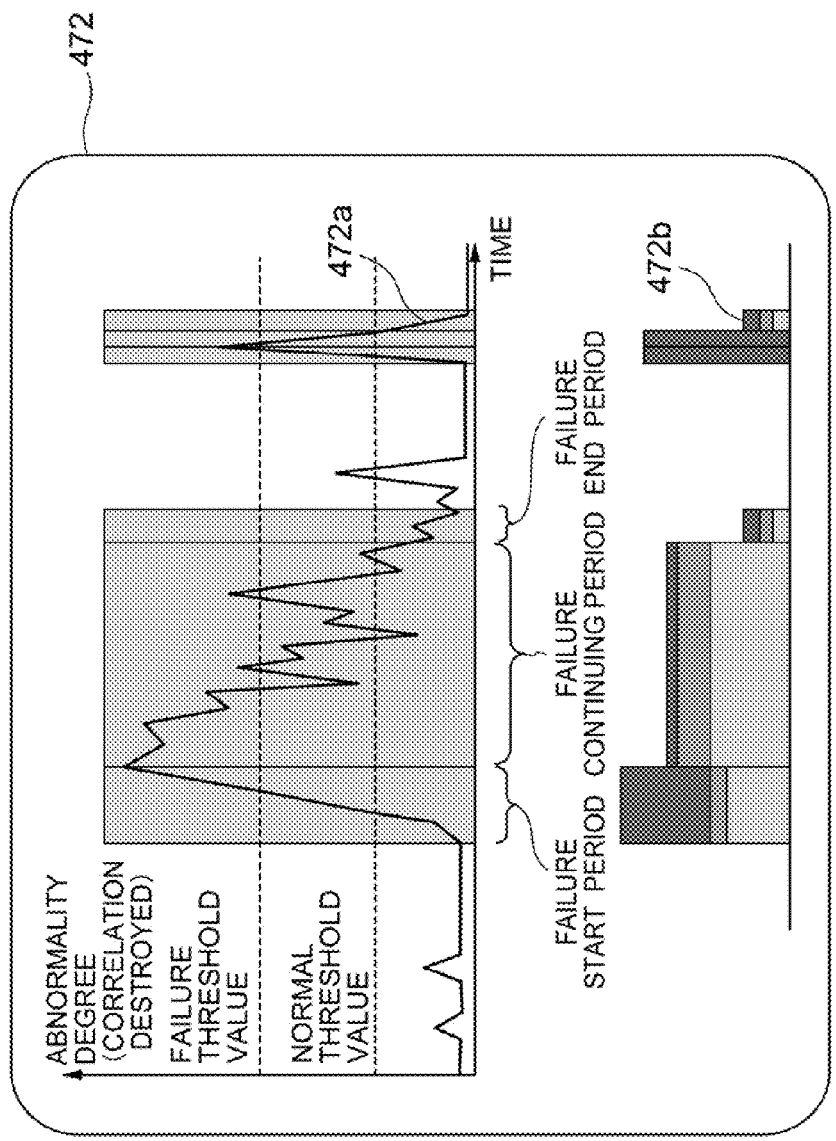
FIG. 13 is a graph showing an example of an abnormal degree distribution calculated by an abnormality degree change information calculation module and an abnormality degree distribution information calculation module of the operations management device (according to the fourth exemplary embodiment) shown in FIG. 8.

FIG. 13 is a graph 472 showing an example of the abnormality degree distribution calculated by the abnormality degree change information calculation module 111 and the abnormality degree distribution information calculation module 113 in the operation management device 400 described above. The graph 472 is structured with a graph 472a that shows time series change of the abnormality degree, and a stacked graph 472b that shows the abnormality degree distribution. In the case described by using FIG. 4 in the first exemplary embodiment, there is a uniform distribution in each of the failure period 1 and the failure period 2.

In the meantime, in the case of the operation management device 400 shown in FIG. 13, each of the failure periods is divided into the three periods of the failure start period, the failure continuing period, and the failure end period by the failure period extraction module 110. Further, the abnormality distribution is generated for each of the divided periods by the abnormality degree change information calculation module 111 and the abnormality degree distribution information calculating model 113.

Figure 14:
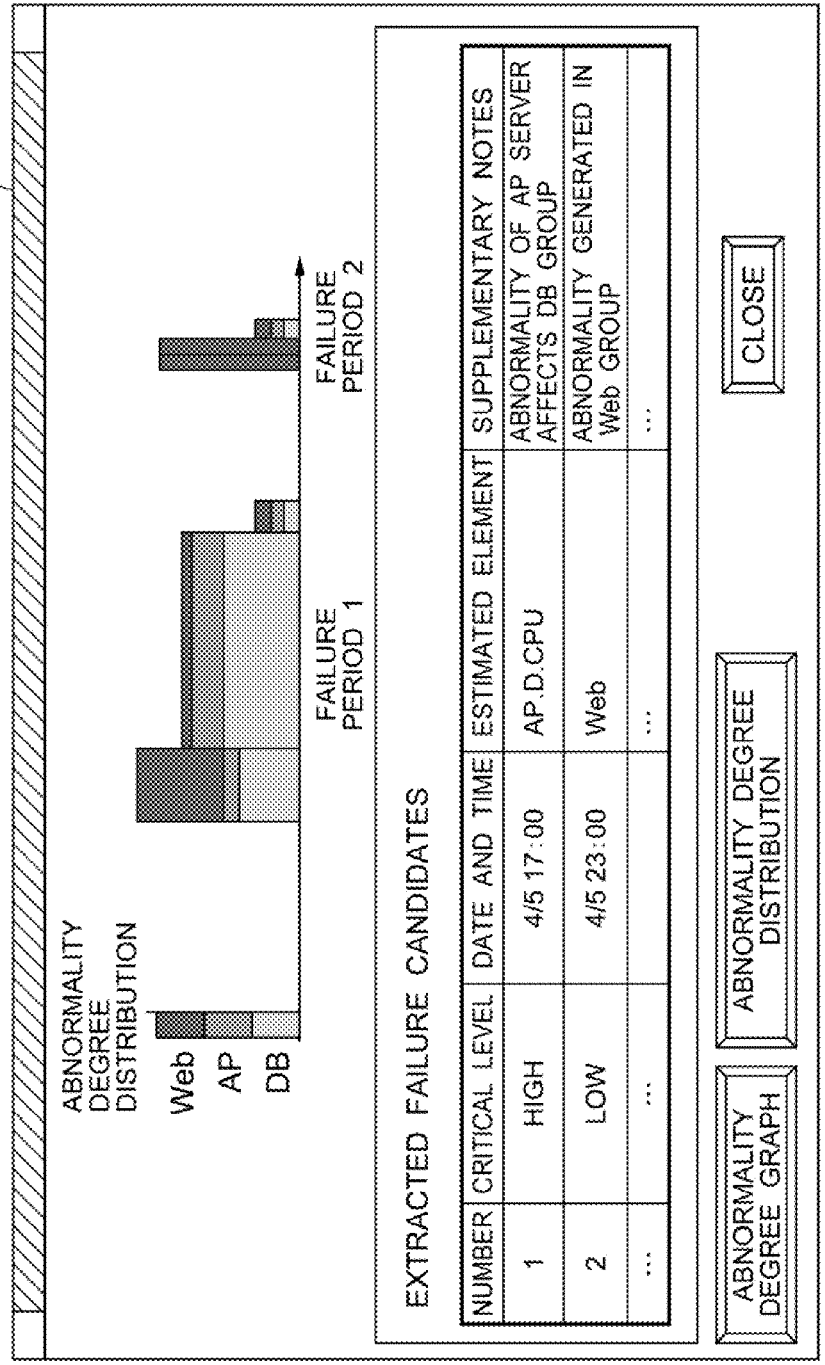
FIG. 14 shows an example of a display screen that is presented to the administrator by an administrator interaction module of the operations management device (according to the fourth exemplary embodiment) shown in FIG. 8.

FIG. 14 shows an example of a display screen 445 of the operation management device 400 that is presented to the administrator by the administrator interaction module 105. On the display screen 445, the distribution screen of the failure 1 and the failure 2 is divided into three stacked graphs on the contrary to the display screen 344 described by referring to FIG. 12 in the third exemplary embodiment. For example, in the case of the failure 1, the distribution in the failure start period shows a greater number of abnormalities in the "Web" group, and the distribution in the failure continuing period shows a greater number of abnormalities in the "DB" group. Thereby, the administrator can grasp how the distribution appears when the failure is generated and what range it affects thereafter.

With the third exemplary embodiment, it is not possible to extract the accurate distribution unless the failure period ends. Further, when the failure continues for a long term, the distribution at the time of having a failure cannot be accurately grasped due to an influence of the distribution of the following abnormality. In the meantime, the fourth exemplary embodiment is capable of separating the distribution at the time of having the failure and the distribution of the periods following thereafter. Therefore, it becomes possible to quickly grasp the failure contents at the time of having the failure and to discriminate the failure cause (the distribution at the time of having the failure) and the affected range (the distribution of the continued periods). Further, it is also possible to grasp the state of returning to the normal state by the distribution of the failure end time.

While the present invention has been described by referring to, the specific embodiments shown in the drawings, the present invention is not limited only to those embodiments shown in the drawings. It is needless to mention that any known structures can be employed as long as the effects of the present invention can be achieved therewith.

Industrial Applicability

The present invention is an information processing device that provides information communication services such as a WEB service and a business service, and it can be applied to an operation management device which detects and localizes performance deterioration of a system in the information processing device.

Reference Numerals
  100, 200, 300, 400 Operation management device
  101 Service execution module
  102 Performance information accumulation module
  103 Information collection module
  104 Failure analysis module
  105 Administrator interaction module
  106 Command execution module
  107 Correlation model generation module
  108 Correlation model accumulation module
  109 Correlation change analysis module
  110 Failure period extraction module
  111 Abnormality degree change information calculation module
  112 Performance classification information accumulation module
  113 Abnormality degree distribution information calculation module
  114 Control unit
  115 Abnormality degree analysis section
  131 Performance classification information
  142 Display screen
  142a Abnormality degree graph
  142b Abnormality degree distribution
  161, 362 Relation chart
  171 Abnormality degree distribution
  171a, 171b Graph
  214 Past failure information accumulation module
  215 Similar failure search module
  216 Performance classification information generation module
  317 Failure element estimation module
  331 Abnormality degree pattern
  343, 344, 445 Display screen
  472, 472a, 472b Graph
  511 Performance information
  521 Correlation model
  541 Display screen
  541a Correlation destroyed number
  541b Correlation chart
  541c List of elements with large abnormality degree

The invention claimed is:

1. An operation management device which acquires performance information for each of a plurality kinds of performance items from a single or a plurality of managed devices configuring a system and performs operation management of the managed devices, the operation management device comprising:

an information collection module which collects at least first performance information showing a time series change in the performance information regarding a first element and second performance information showing time series change in the performance information regarding a second element out of elements, when the performance items and the managed devices are taken as the elements;

a correlation model generation module which derives a correlation function between the first and second performance information, and generates a correlation model based on the correlation function;

a correlation change analysis module which judges whether or not the current first and second performance information acquired by the information collection module satisfies a relation shown by the correlation function within a specific error range;

a failure period extraction module which, when the correlation change analysis module judges that it is in a state where the first and second performance information does not satisfy the relation shown by the correlation function, extracts a period of that state as a failure period:, an abnormality degree change information calculating module which calculates statistical information regarding an abnormality degree that is a degree of the first and second performance information being deviated from the correlation function during the failure period extracted by the failure period extraction module as abnormality degree change information;

a performance classification information accumulation module which classifies the performance in formation into a plurality of kinds and saves the information as performance classification information; and an abnormality degree distribution information calculating module which extracts the performance information and the abnormality degrees contained in the correlation changed in the failure period from the performance classification information accumulated in the performance classification information accumulation module, and calculates abnormality degree distribution information that shows the distribution of the abnormality degrees for each element of the performance information.

2. The operation management device as claimed in claim 1, comprising
a performance classification information generation module which classifies, from the correlation model, the performance information according to strength in the correlation between the performance information and the pattern of the related elements to generate the performance classification information.

3. The operation management device as claimed in claim 1, comprising
a failure analysis module which detects generation of failure from the first and second performance information;
a past failure information accumulation module which accumulates a history of failures analyzed by the failure analysis module; and
a similar failure search module which compares the information stored in the past failure information accumulation module with the abnormality degree change information and the abnormality degree distribution information to search the failure similar to the abnormality degree change information and the abnormality degree distribution information.

4. The operation management device as claimed in claim 2, comprising
a failure element estimation module which predicts, for each of the elements, an abnormality degree distribution pattern assumed in a case where there is a failure generated in the element and the failure affects the other elements based on the correlation model and the classification information as well as order information contained in the performance information, and compares the abnormality degree distribution information with the abnormality degree distribution pattern to estimate which of the element the failure is generated.

5. The operation management device as claimed in claim 1, wherein
the failure period extraction module classifies the failure period into a failure start period, a failure continuing period, and a failure end period.

6. An operation management method which acquires performance information for each of a plurality kinds of performance items from a single or a plurality of managed devices configuring a system and performs operation management of the managed devices, the operation management method comprising:
collecting at least first performance information showing a time series change in the performance information regarding a first element and second performance information showing time series change in the performance information regarding a second element out of elements, when the performance items and the managed devices are taken as the elements;
deriving a correlation function between the first and second performance information, and generating a correlation model based on the correlation function;
judging whether or not the acquired first and second performance information satisfies a relation shown by the correlation function within a specific error range;
when judged that it is in a state where the first and second performance information does not satisfy the relation shown by the correlation function, extracting a period of that state as a failure period;
calculating statistical information regarding an abnormality degree that is a degree of the first and second performance information being deviated from the correlation function during the failure period extracted as abnormality degree change information;
classifying the performance in formation into a plurality of kinds and saving the information as performance classification information; and
extracting the performance information and the abnormality degrees contained in the correlation changed in the failure period from the performance classification information accumulated, and calculating abnormality degree distribution information that shows the distribution of the abnormality degrees for each element of the performance information.

7. The operation management method as claimed in claim 6, comprising
classifying, from the correlation model, the performance information according to strength in the correlation between the performance information and the pattern of the related elements to generate the performance classification information.

8. The operation management method as claimed in claim 6, comprising
comparing stored past failure history information with the abnormality degree change information and the abnormality degree distribution information to search the failure similar to the abnormality degree change information and the abnormality degree distribution information.

9. The operation management method as claimed in claim 7, comprising
predicting, for each of the elements, an abnormality degree distribution pattern assumed in a case where there is a failure generated in the element and the failure affects the other elements based on the correlation model and the classification information as well as order information contained in the performance information, and comparing the abnormality degree distribution information with the abnormality degree distribution pattern to estimate which of the element the failure is generated.

10. A non-transitory computer readable recording medium storing an operation management program for causing a computer, which controls an operation management device that acquires performance information for each of a plurality kinds of performance items from a single or a plurality of managed devices configuring a system and performs operation management of the managed devices, to execute:

a function which collects at least first performance information showing a time series change in the performance information regarding a first element and second performance information showing time series change in the performance information regarding a second element out of elements, when performance items and the managed devices are taken as the elements;

a function which derives a correlation function between the first and second performance information, and generates a correlation model based on the correlation function;

a function which judges whether or not the acquired current first and second performance information satisfies a relation shown by the correlation function within a specific error range;

a function which, when it is judged to be in a state where the first and second performance information does not satisfy the relation shown by the correlation function, extracts a period of that state as a failure period;

a function which calculates statistical information regarding an abnormality degree that is a degree of the first and second performance information being deviated from the correlation function during the failure period extracted as abnormality degree change information;

a function which classifies the performance in formation into a plurality of kinds and saves the information as performance classification information; and a function which extracts the performance information and the abnormality degrees contained in the correlation changed in the failure period from the performance classification information accumulated, and calculates abnormality degree distribution information that shows the distribution of the abnormality degrees for each element of the performance information.

11. Operation management means for acquiring performance information for each of a plurality kinds of performance items from a single or a plurality of managed devices configuring a system and performing operation management of the managed devices, the operation management means comprising:

information collection means for collecting at least first performance information showing a time series change in the performance information regarding a first element and second performance information showing time series change in the performance information regarding a second element out of elements, when the performance items and the managed devices are taken as the elements;

correlation model generation means for deriving a correlation function between the first and second performance information, and generating a correlation model based on the correlation function;

correlation change analysis means for judging whether or not the current first and second performance information acquired by the information collection means satisfies a relation shown by the correlation function within a specific error range; failure period extraction means for, when the correlation change analysis means judges that it is in a state where the first and second performance information does not satisfy the relation shown by the correlation function, extracting a period of that state as a failure period;

abnormality degree change information calculating means for calculating statistical information regarding an abnormality degree that is a degree of the first and second performance information being deviated from the correlation function during the failure period extracted by the failure period extraction means as abnormality degree change information;

performance classification information accumulation means for classifying the performance in formation into a plurality of kinds and saves the information as performance classification information; and abnormality degree distribution information calculating means for extracting the performance information and the abnormality degrees contained in the correlation changed in the failure period from the performance classification information accumulated in the performance classification information accumulation means, and calculates abnormality degree distribution information that shows the distribution of the abnormality degrees for each element of the performance information.

* * * * *